United States Patent
West et al.

(10) Patent No.: US 12,195,938 B2
(45) Date of Patent: Jan. 14, 2025

(54) PACKER ELEMENT

(71) Applicant: PLANET 42 LIMITED, Aberdeen (GB)

(72) Inventors: Alan West, Aberdeen (GB); John Giles, Aberdeen (GB)

(73) Assignee: PLANET 42 LIMITED, Aberdeen (GB)

( * ) Notice: Subject to any disclaimer, the term of this patent is extended or adjusted under 35 U.S.C. 154(b) by 737 days.

(21) Appl. No.: 17/269,146

(22) PCT Filed: Aug. 23, 2019

(86) PCT No.: PCT/GB2019/052375
§ 371 (c)(1),
(2) Date: Feb. 17, 2021

(87) PCT Pub. No.: WO2020/044025
PCT Pub. Date: Mar. 5, 2020

(65) Prior Publication Data
US 2021/0324599 A1    Oct. 21, 2021

(30) Foreign Application Priority Data

Aug. 31, 2018 (GB) ..................... 1814224

(51) Int. Cl.
*E02B 17/06* (2006.01)
*B63B 75/00* (2020.01)
(Continued)

(52) U.S. Cl.
CPC ............ *E02D 27/425* (2013.01); *B63B 75/00* (2020.01); *E02B 17/06* (2013.01); *E02D 27/52* (2013.01);
(Continued)

(58) Field of Classification Search
CPC ............................... E21B 33/127; E02B 17/06
(Continued)

(56) References Cited

U.S. PATENT DOCUMENTS 3,575,757 A    4/1971 Smith
4,090,431 A *  5/1978 Hirmann ................... B66F 3/35
                                                                 92/92
(Continued)

FOREIGN PATENT DOCUMENTS

DE          216691 A1    12/1984
GB        2387148 A    10/2003
(Continued)

OTHER PUBLICATIONS

"International Search Report and Written Opinion of the International Searching Authority", International Application No. PCT/GB2019/052375, Jan. 24, 2020, 17 pp.
(Continued)

*Primary Examiner* — Thomas E Lazo
(74) *Attorney, Agent, or Firm* — Myers Bigel, P.A.

(57) ABSTRACT

There is disclosed a packer and/or gripper element (10), beneficially for use offshore and/or underwater, the packer and/or gripper (10) comprising an inflatable element or cushion (15a, 15b, 15c, 15d), wherein a periphery of the/each inflatable element or cushion (15a, 15b, 15c, 15d) comprises at least one corner, the at least one corner comprising a concave portion (30a, 30b, 30c, 30d). The disclosed packer and/or gripper element (10) comprises a plurality of inflatable elements (15a, 15b, 15c, 15d), each inflatable element (15a, 15b, 15c, 15d) being communicably coupled to an adjacent inflatable element (15a, 15b, 15c, 15d) by a port (155a, 155b) disposed between the inflatable elements (15a, 15b, 15c, 15d).

15 Claims, 22 Drawing Sheets

(51) Int. Cl.
*E02D 27/42* (2006.01)
*E02D 27/52* (2006.01)
*F03D 13/25* (2016.01)
*E02B 17/00* (2006.01)
*F16J 15/46* (2006.01)

(52) U.S. Cl.
CPC ...... *F03D 13/25* (2016.05); *E02B 2017/0039* (2013.01); *E02B 2017/0043* (2013.01); *F16J 15/46* (2013.01)

(58) Field of Classification Search
USPC .......................... 277/331, 332; 92/89, 91, 92
See application file for complete search history.

(56) References Cited

U.S. PATENT DOCUMENTS

| | | | |
|---|---|---|---|
| 5,506,012 A * | 4/1996 | Wright | F15B 15/10 428/36.1 |
| 2010/0170682 A1 * | 7/2010 | Brennan, III | E21B 33/1216 166/387 |
| 2013/0195556 A1 * | 8/2013 | Mills | E02B 3/127 141/10 |
| 2014/0202370 A1 | 7/2014 | Smith | |
| 2018/0001171 A1 * | 1/2018 | Zavracky | A63B 63/06 |

FOREIGN PATENT DOCUMENTS

| | | | | |
|---|---|---|---|---|
| GB | 2548965 A | * | 10/2017 | ............. E02B 17/06 |
| WO | 2012070933 A2 | | 5/2012 | |

OTHER PUBLICATIONS

"Patents Act 1977: Search Report under Section 17(5)", GB Application No. GB1814224.0, Feb. 22, 2019, 4 pp.

"Patents Act 1977: Search Report under Section 17(6)", GB Application No. GB1814224.0, Oct. 10, 2019, 2 pp.

* cited by examiner

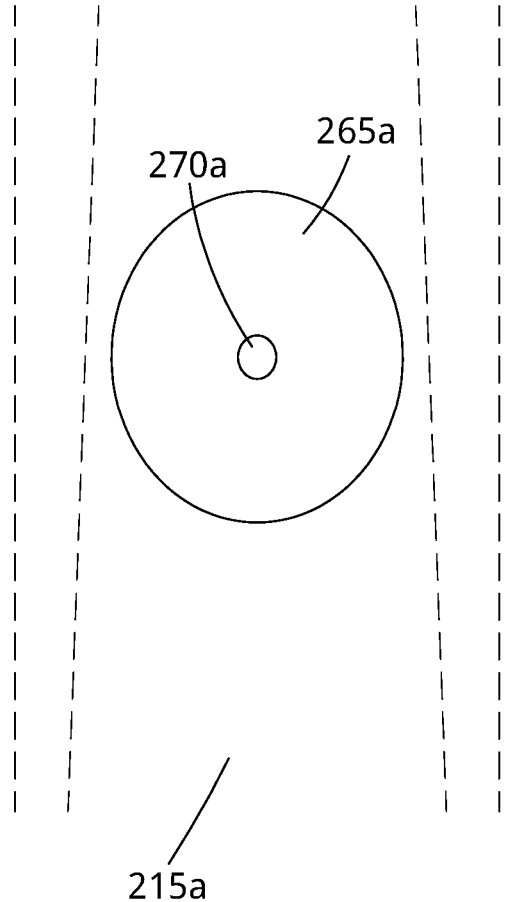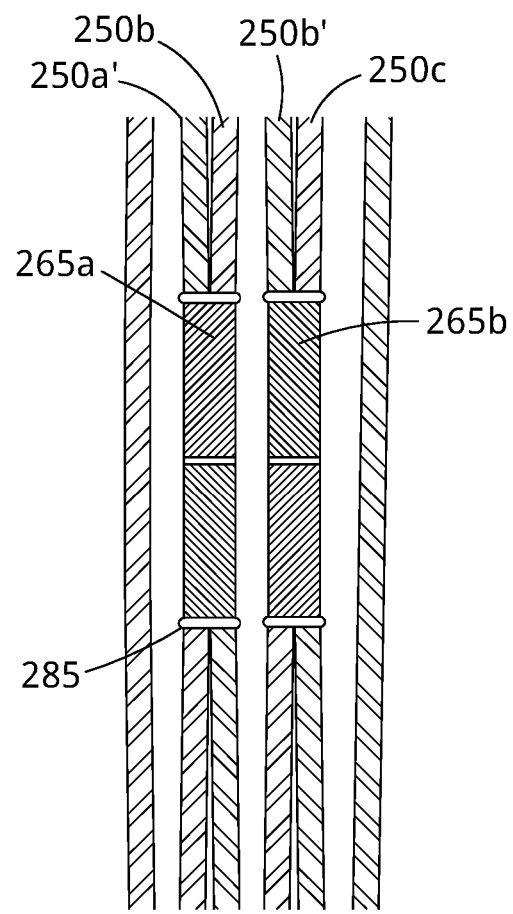
Fig. 5a
Fig. 5b

Section View
of inflation port
infill piece
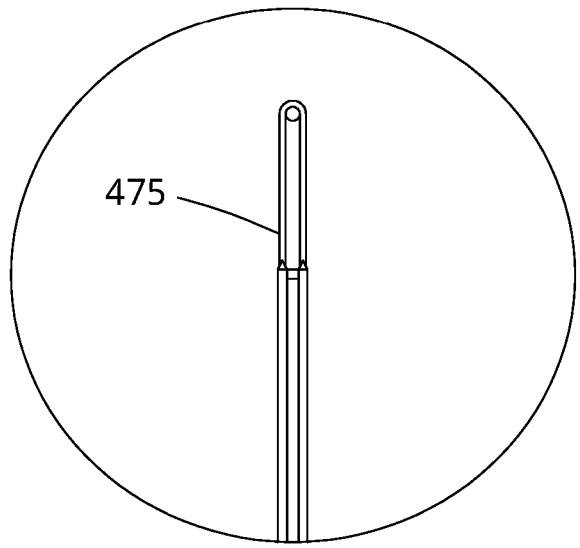
475
Inflation Tube
8mm od x 2mm wt x 100 long
Material 316 L
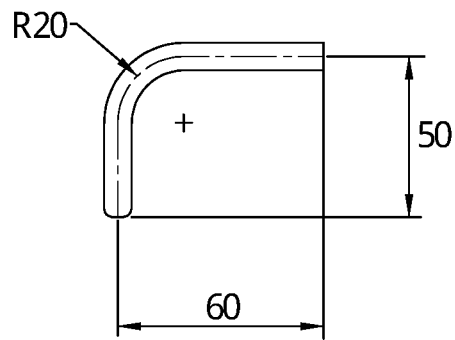
R20
50
60
Fig. 9b

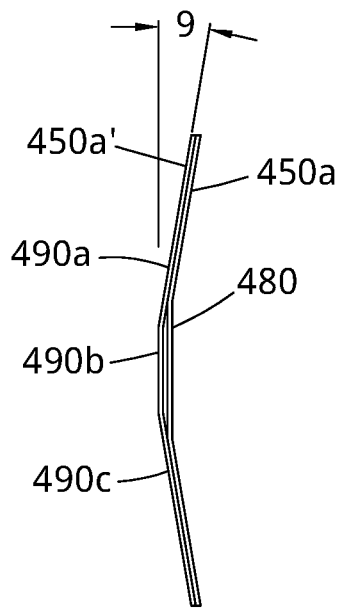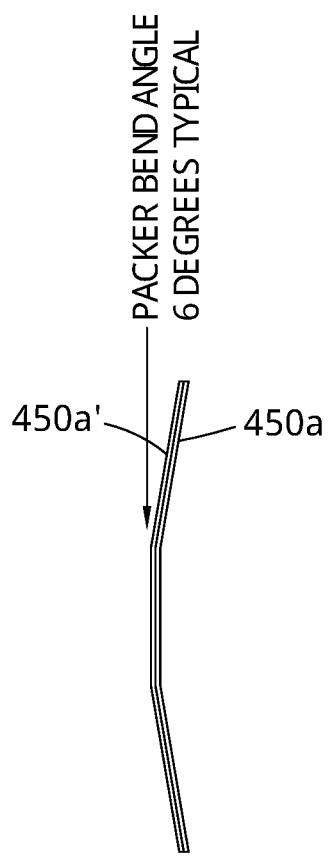
Fig. 9c

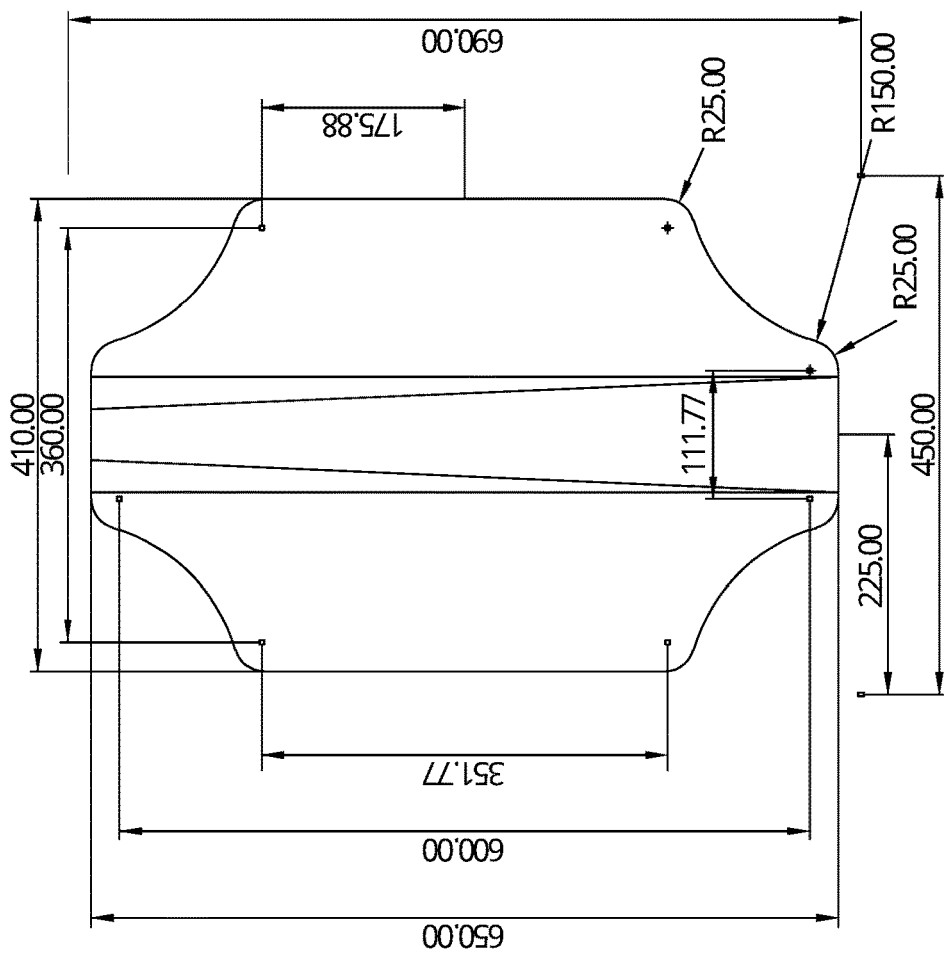
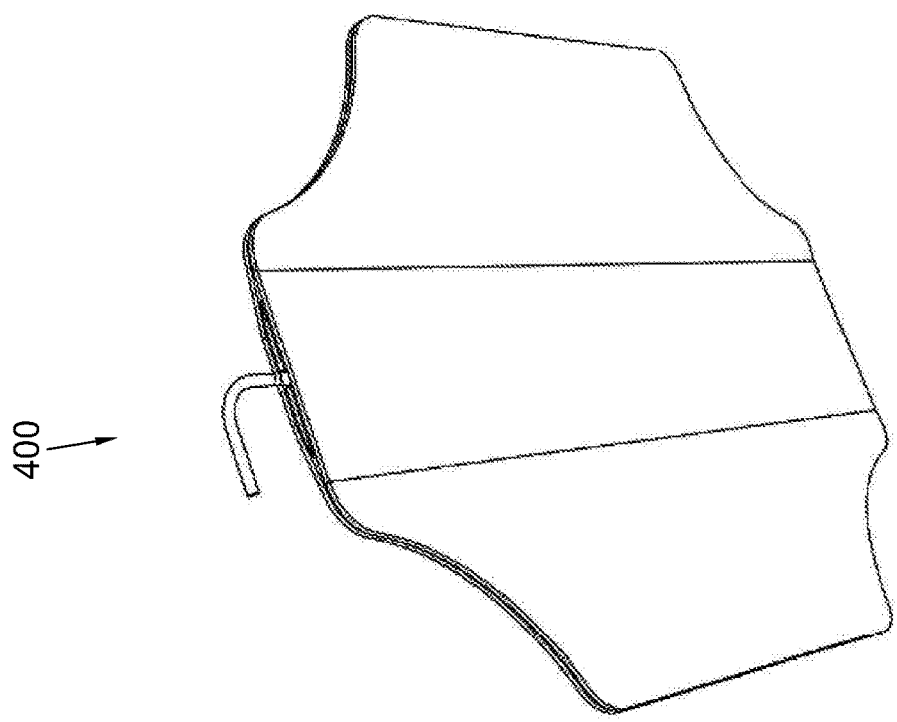
Fig. 9d

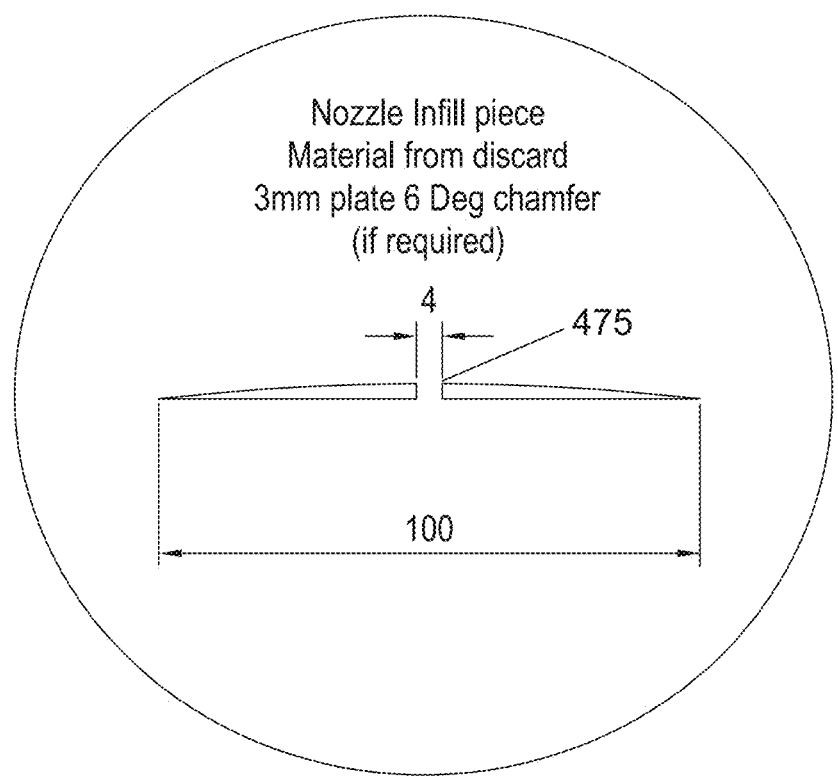
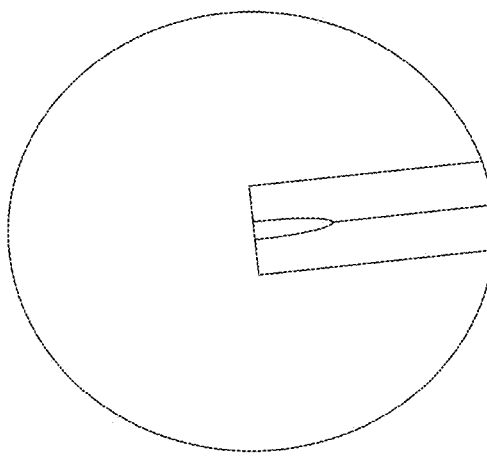
Fig. 9e

PACKER ELEMENT

RELATED APPLICATIONS

This application is a 35 U.S.C. § 371 national stage application of PCT Application No. PCT/GB2019/052375, filed on Aug. 23, 2019, which claims priority from Great Britain Patent Application No. 1814224.0, filed on Aug. 31, 2018, the contents of which are incorporated herein by reference in their entireties. The above-referenced PCT International Application was published in the English language as International Publication No. WO 2020/044025 A1 on Mar. 5, 2020.

FIELD OF INVENTION

The present invention relates to a packer and/or gripper element, a packer or arrangement or apparatus and an associated system drive system and method. The packing/gripping element, arrangement apparatus, system and/or method may find utility offshore and/or in a marine environment.

BACKGROUND TO INVENTION

Offshore structures, such as offshore wind turbines, may be supported and/or mounted by a support structure, such as for example a jacket or monopile. The jacket may typically have three or four legs, which may be arranged to form a lattice structure. Jackets can be lowered onto pre-installed piles. The piles may be installed by driving them into the seabed using a piling hammer and/or a piling template.

Once the jacket has been lowered onto the piles, the jacket may be permanently fixed to the piles, for example, by forming a cemented or grouted connection between the jacket and the piles. The cemented or grouted connection may transfer the loads between the jacket and the piles.

It is desirable to minimise or prevent any movement between the jacket and piles, until the cement is fully cured so as to form a strong and robust connection between the jacket and the piles. This is often achieved by waiting for sufficiently calm weather conditions, which may lead to increased costs for installing the jackets on the piles.

Subsea packers and/or grippers may be used in the offshore industry for securing a support structure to a foundation, such as securing the jacket to the pile. Such packers and/or grippers can be complex devices with multiple moving or configurable components and parts. Such packers and/or grippers can be complex and costly to operate and maintain. Furthermore, such packers and/or grippers may exhibit several potential failure modes, thus impacting upon the reliability of such packers and/or grippers.

It is an object of at least one embodiment of at least one aspect of the present invention to obviate or at least mitigate one or more problems or disadvantages in the prior art.

SUMMARY OF INVENTION

According to the present invention there is providing a packer and/or gripper member according to the appended claims.

A packer and/or gripper member according to embodiments of the present invention may be capable of positioning, locating, stabilising, jacking, packing, gripping, holding or centralising one item, e.g. member or structure, relative to another item, e.g. member or structure.

It will, therefore, be appreciated that herein "packing" and/or "gripping" is/are meant to include or comprise any of the aforementioned and at least in some embodiments the terms "packer", "packing" and "gripper" or "gripping" may be used synonymously or similarly.

FIRST INVENTION

According to a first aspect of the present invention there is provided a packing and/or gripping member, such as an offshore packing and/or gripping member, comprising a plurality of inflatable elements or cushions, each inflatable element or cushion communicably coupled to an adjacent inflatable element by a port disposed between the inflatable elements.

One or more or each inflatable element or cushion may be deflatable.

Port

Each inflatable element may comprise or define a chamber for receiving a fluid.

The packing and/or gripping member may comprise a plurality of ports.

The port, or a portion of the port, may be disposed on or within a face or plate at least one of the plurality of inflatable elements.

The port, or a portion of the port, may be disposed on or within at least one face or plate of each of the plurality of inflatable elements.

Each port may be disposed at a centre of or substantially at a centre of, at least one face or plate of each of the plurality of inflatable elements.

The port may be disposed at or substantially at an outermost point of at least one face or plate of an inflatable element when the packing and/or gripping member is in an expanded configuration.

The port may comprise a coupling member. The port may comprise a plurality of coupling members.

The coupling member may be substantially ring or disc shaped.

The coupling member may comprise a throughbore or channel.

The port may comprise a coupling member attached to a face or plate, such as around or within a hole disposed on a face or plate, of at one inflatable element.

The port may comprise a coupling member attached to a face or plate, such as around or within a hole disposed on a face or plate, of each of two inflatable elements.

The port may comprise at least one hole disposed on a face or plate of at least one of the plurality of inflatable elements.

The port may comprise a hole disposed on a face or plate of a first inflatable element and a hole disposed on a face or plate of a second inflatable element. The first and second inflatable elements may be adjacent to one another, such that the holes are substantially aligned. The port may further comprise a coupling member affixedly attached around or within the first and second holes, thus coupling the first and second inflatable elements.

The at least one coupling member may couple, such as directly and/or communicably couple, a hole of the first inflatable element with a hole of the adjacent second inflatable element. By aligning a throughbore of the coupling member with the hole of the first inflatable element and with the hole of the adjacent second inflatable element, the first and second inflatable elements maybe communicably coupled.

The at least one coupling member may be welded, such as seal welded or edge welded, fused, adhered, or otherwise attached to a/each port.

Inlet and Spacer

The plurality of inflatable elements may be arranged in a stack. The plurality of inflatable elements may be directly and/or communicably coupled in a stack.

At least one of the plurality of inflatable elements may comprise an inlet.

The inlet may be disposed at or around a perimeter of a face or plate of an inflatable element.

The inflatable element comprising the inlet may be disposed at an outer position within the stack of inflatable elements.

The inflatable element comprising the inlet may be disposed at an inner position within the stack of inflatable elements.

The inlet may be adapted for coupling to a line, such as a hydraulic line. The inlet may be adapted for supplying fluid, such as a pressurised fluid, to the packing and/or gripping member.

The stack may preferably comprise three inflatable elements. In alternative embodiments, the stack may comprise two, or more than three inflatable elements.

At least one of the inflatable elements may comprise a spacer member.

The spacer member may be disposed at, or around, the inlet.

The spacer member may be disposed between adjacent faces or plates of an inflatable element. The spacer member may be configured to separate adjacent faces or plates of an inflatable element when the element is deflated, i.e. the packing and/or gripping member is in a retracted configuration. The spacer member may be generally wedge-shaped.

Shape of Stack

Each inflatable element of the plurality of inflatable elements may form a curved shape when deflated. A cross-section of each inflatable element of the plurality of inflatable elements may form a substantially curved shape when deflated. A cross-section of each inflatable element of the plurality of inflatable elements may comprise a plurality of substantially straight or planar portions. Each substantially straight or planar portions may be inclined at an angle of approximately 6 degrees) (6°) from an adjacent substantially straight or planar portion. An angle of inclination between straight or planar portions may be greater of smaller than 6 degrees (6°), such as between 1 degree (1°) and 12 degrees (12°). Each inflatable element of the plurality of inflatable elements may comprise at least one bend in a face or plate of the inflatable element when the inflatable element in not inflated.

Each inflatable element may have a substantially 'c' shaped cross-section when deflated. Each inflatable element may be shaped to fitted in an annular space.

General Configuration

The packing and/or gripping member may be configurable between a retracted configuration and an expanded configuration.

The retracted configuration may correspond to a configuration wherein at least one inflatable element is deflated. The expanded configuration may correspond to an inflated configuration.

The packing and/or gripping member may be configured to be actuated from the retracted configuration into the expanded configuration by a fluid, such as a pressurised fluid, supplied to packing and/or gripping member.

The inflatable element may be an inflatable element according to the second aspect.

SECOND INVENTION

According to a second aspect of the present invention, there is provided a packing and/or gripping member, such as an offshore packing and/or gripping member, comprising at least one inflatable element or cushion, wherein a periphery of the at least one or each inflatable element comprises at least one corner, the at least one corner comprising a concave portion.

One or more or each inflatable element may be deflatable.

The inflatable element may be an inflatable element according to the first aspect.

Shape of Periphery

The inflatable element may comprise a plurality of corners, such as four corners.

The inflatable element may comprise a plurality of concave portions.

Each corner may comprise a concave portion.

The inflatable element may have four concave portions.

The at least one/each inflatable element or cushion may have a plurality of sides, e.g. four (4) sides.

A periphery of the inflatable element may be substantially rectangular.

A periphery of the inflatable element may be substantially square or trapezoidal or parallelogrammatic.

The periphery of the inflatable element may correspond to a substantially rectangular shape with concave (cut-away) portions at each corner.

The at least one concave portion may be joined to an adjacent side of the periphery by at least one curved, radiused and/or convex portion.

The at least one concave portion may be joined to adjacent sides of the periphery by curved, radiused and/or convex portions.

A length or extent of the at least one concave portion may be greater than a length or extent of the adjacent curved, radiused and/or convex portions.

The periphery of the inflatable element may comprise at least one pair of symmetrical sides. Each side of the periphery may comprise a substantially straight portion.

Each straight portion may be joined/adjoined to an adjacent straight portion by at least one concave portion and at least two curved, radiused and/or convex portions.

Each straight portion may be joined/adjoined to an adjacent straight portion by, in sequence, a convex portion, a concave portion, and a convex portion.

The periphery of the inflatable element may be substantially symmetrical about a first axis. The periphery of the inflatable element may be substantially symmetrical about a second axis. The second axis may be perpendicular to the first axis.

Each concave portion may not be directly adjoined to another concave portion.

Overall Form of Inflatable Element

Each inflatable element may comprise two faces, plates and/or planar members. The planar member may be substantially planar in a deflated disposition and curved (concave) in an inflated disposition. The two faces, plates and/or planar member may be adjacent to one another.

The element may comprise opposing faces, plates and/or planar members, e.g. a pair of opposing faces, plates, or planar members.

Each face, plate or planar member may comprise a sheet material. Each face, plate or planar member may be substantially planar.

Each face or plate may comprise or be made or formed from a deformable element.

Each face, plate or planar member may be of an even uniform, or substantially even uniform, thickness.

Each face, plate or planar member may comprise or be made or formed from a sheet metal material.

The/each face, plate or planar member may be coated and/or infused with a metal or metal alloy.

The/each face, plate or planar member may comprise a composite material.

The/each face, plate or planar member may be welded, such as seal welded or edge welded, fused, adhered, or otherwise attached to each other.

The/each face, plate or planar member may be welded, such as seal welded or edge welded, fused, adhered, or otherwise attached to each other around a periphery of each face or plate.

The inflatable element may comprises/defines a chamber for receiving a fluid. The chamber may be provided between the two faces, plates or planar member.

The inflatable element may be configurable between a retracted configuration and an expanded configuration.

The retracted configuration may correspond to a deflated configuration. The expanded configuration may correspond to an inflated configuration.

Element with Ports

The inflatable element may be adapted to be stacked with or on a further inflatable element. The inflatable element may be adapted to cooperate with one or more further inflatable elements to form a stack.

The inflatable element may comprise a port.

The port may be disposed on or within at least one face or plate of the inflatable element. A port may be disposed on or within each face or plate of the inflatable element.

The port may comprise or may be a hole.

The port may be disposed at a centre of, or substantially at a centre of, a face or plate of the inflatable element.

The port may be disposed on or within a face or plate of the inflatable element at a location corresponding to a location of maximum deviation between the deflated configuration and the inflated configuration.

The port may be disposed at, or substantially at, an outermost point of at least one face or plate when the packing and/or gripping member is in an expanded configuration.

The port may comprise a coupling member.

The port may be adapted to communicably couple the inflatable element to a further inflatable element.

At least one of the inflatable elements may comprise an inlet. The inlet may be disposed on or within an outer face or plate of an inflatable element. The inlet may be disposed on or within an outer perimeter of an inflatable element. The inlet may be adapted for coupling to a line, such as a hydraulic line. The inlet may be adapted for supplying fluid, such as a pressurised fluid, to the inflatable element.

Plurality of Inflatable Elements

The packing and/or gripping member may comprise a plurality of inflatable elements. Each inflatable element may be coupled with another, adjacent inflatable element as described above with regard to the first aspect.

The packing and/or gripping member may be configurable between a retracted configuration and an expanded configuration. The retracted configuration may correspond to a deflated configuration. The expanded configuration may correspond to an inflated configuration.

THIRD INVENTION

According to a third aspect of the present invention, there is provided a packing and/or gripping arrangement, such as an offshore and/or underwater packing and/or gripping arrangement, comprising a plurality of packing and/or gripping members according to the first or second aspect.

The packing and/or gripping arrangement may be configurable between a retracted configuration and an expanded configuration.

When the packing and/or gripping arrangement is in the expanded configuration, the packing and/or gripping arrangement may be configured to secure at least one portion of a support structure to at least one portion of a foundation.

The packing and/or gripping arrangement may be configured to be actuated from the retracted configuration into the expanded configuration by a fluid, such as a pressurised fluid, supplied to the at least one inflatable element.

When the packing and/or gripping arrangement is in the expanded configuration, the packing and/or gripping arrangement may be configured to position and/or align the at least one portion of the support structure relative to the at least one portion of the foundation.

When the packing and/or gripping arrangement is in the expanded configuration, the packing and/or gripping arrangement may be configured to minimise or substantially prevent movement of the at least one portion of the support structure relative to the at least one portion of the foundation to allow for fixation of the at least one portion of the support structure to the foundation.

When the packing and/or gripping arrangement is actuated from the retracted configuration into the expanded configuration, the packing and/or gripping arrangement may be configured to exert a force and/or load to allow for securing of the at least one portion of the support to the at least one portion of the foundation. The force exerted by the packing and/or gripping arrangement may comprise a force and/or load, e.g. a radial force and/or load.

The packing and/or gripping arrangement may be configured for arrangement in a space, e.g. an annular space, e.g. formed between the at least one portion of the support structure and the at least one portion of the foundation.

When the packing and/or gripping arrangement is actuated from the retracted configuration into the expanded configuration, the packing and/or gripping arrangement may be configured to expand radially into the annular space to secure the at least one portion of the support structure to the at least one portion of the foundation. The packing and/or gripping arrangement may be configured to conform to a space available in the annular space.

FOURTH INVENTION

According to a fourth aspect of the present invention there is provided a structure, such as a support structure or a foundation for mounting a support structure, wherein the structure comprises a packing and/or gripping arrangement according to the third aspect.

The structure may comprise an annular space formed between the at least one portion of the support structure and at least one portion of the foundation.

The packing and/or gripping arrangement may be disposed in the annular space.

FIFTH INVENTION

According to a fifth aspect of the present invention there is provided a system, such as an offshore and/or underwater system, for securing a support structure to a foundation, the system comprising:

a foundation arranged on a floor of a body of water, such as a seabed;

a support structure, the support structure being configured for attachment to the foundation; and a packing and/or gripping arrangement according to the third aspect, wherein when the packing and/or gripping arrangement is in the expanded configuration, the packing and/or gripping arrangement is configured to secure at least one portion of the support structure to at least one portion of the foundation

SIXTH INVENTION

According to a sixth aspect of the present invention there is provided a method for securing a support structure to a foundation, the method comprising:

arranging a foundation on a floor of a body of water, such as a seabed;

arranging a support structure on the foundation; and securing at least one portion of the support structure to at least one portion of the foundation by actuating a packing and/or gripping arrangement according to the third aspect from a retracted configuration to an expanded configuration.

SEVENTH INVENTION

According to a seventh aspect of the present invention there is provided a method for actuating a packing and/or gripping arrangement, such as an offshore and/or underwater packing and/or gripping arrangement, from a retracted configuration to an expanded configuration; the method comprising:

providing a packing and/or gripping arrangement according to the third aspect;

supplying pressurised fluid to one of the inflatable elements.

The step of supplying pressurised fluid to one of the inflatable elements may comprise coupling a line to an inlet of the inflatable element.

The step of supplying pressurised fluid to one of the inflatable elements may comprise supplying pressuring fluid to a plurality or stack of inflatable elements via an inlet disposed on or within only one of the inflatable element.

EIGHTH INVENTION

According to an eighth aspect of the present invention there is provided a method of manufacturing a packing and/or gripping arrangement, such as an offshore and/or underwater packing and/or gripping arrangement, the method comprising the step of communicably coupling a first inflatable element to a second inflatable element by a port disposed between the first and second inflatable elements.

The inflatable elements may be inflatable elements according to the first or second aspects.

The method may comprise the step of forming a hole in a first face or plate of the first inflatable element.

The method may comprise the step of forming a hole in a first face or plate of the second inflatable element.

The method may comprise the step of affixing, such as welding by seal welding, edge welding or the like, a coupling member around or within the hole on the first face or plate of the first inflatable element.

The method may comprise the step of affixing, such as welding by seal welding, edge welding or the like, the coupling member around or within the hole on the first face or plate of the second inflatable element.

The method may comprise forming a port between the first and second inflatable elements before the first and second faces or plates of the inflatable elements are affixed to one another. That is, the port may be formed between components of the inflatable elements before the inflatable elements are assembled.

The method may comprise the step of affixing, such as welding by seal welding, edge welding or the like, a second face, plate or planar member of the first inflatable element to a first face, plate or planar member of the first inflatable element.

The method may comprise the step of affixing, such as welding by seal welding, edge welding or the like, a second face, plate or planar member of the second inflatable element to the first face, plate or planar member of the second inflatable element.

The method may comprise affixing or attaching an inlet to at least one of the inflatable elements. The method may comprise providing at least one of the inflatable elements with an inlet.

The method may comprise affixing or attaching a spacer element to at least one of the inflatable elements. The method may comprise disposing the spacer element inside an inflatable element. The spacer element may be disposed adjacent to or around the inlet such that, when the inflatable element is deflated, the spacer element maintains a space or void around the inlet.

It should be understood that the features defined above in accordance with any aspect of the present invention or below relating to any specific embodiment of the invention may be utilised, either alone or in combination with any other defined feature, in any other aspect or embodiment or to form a further aspect or embodiment of the invention.

BRIEF DESCRIPTION OF DRAWINGS

These and other aspects of the present invention will now be described, by way of example only, with reference to the accompanying drawings, which are:

FIG. 2b a side cross-sectional view of the packing and/or gripping member of FIG. 2a;

FIG. 3 a perspective, exploded view of the packing and/or gripping member of FIG. 2a;

FIG. 5a a cross-sectional front view of the packing and/or gripping member of FIG. 4;

FIG. 5b a cross-sectional side view of the packing and/or gripping member of FIG. 4;

FIG. 6 a further exploded perspective view of the packing and/or gripping member of FIG. 2a;

FIG. 7a a front cross-sectional view of a packing and/or gripping member according to a still further embodiment of the present invention;

FIG. 7b a side cross-sectional view of the packing and/or gripping member of FIG. 7a;

FIGS. 9a to e a diagram showing fabrication details and dimensions of an inflatable element of a packing and/or gripping member according an embodiment of the present invention;

DETAILED DESCRIPTION OF DRAWINGS

Figure 1:
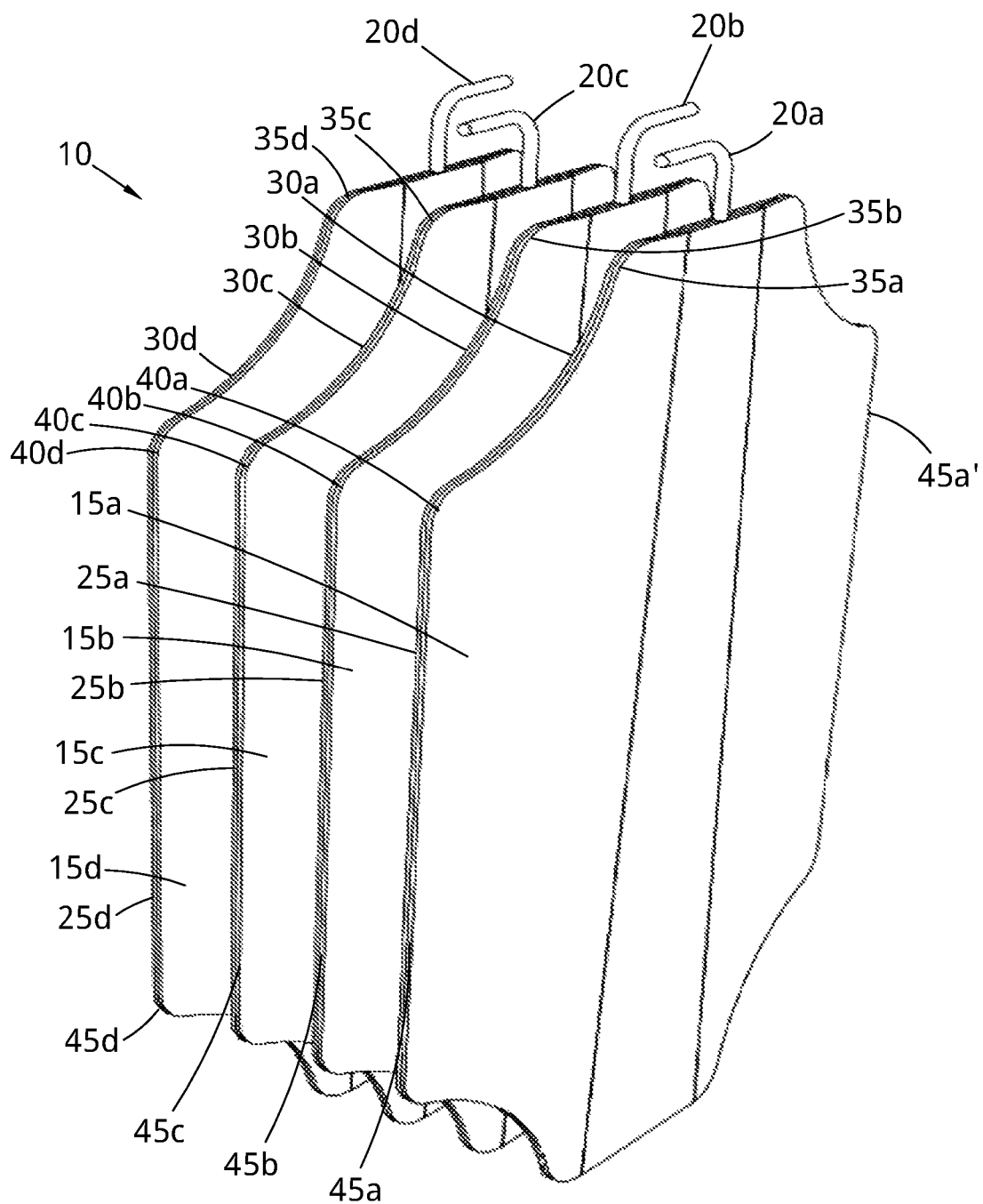
FIG. 1 a perspective view of a packing and/or gripping member according to an embodiment of the present invention.

Referring to FIG. 1 there is shown a packing and/or gripping member, generally denoted 10. In the example embodiment shown, the packing and/or gripping member 10 comprises four inflatable elements 15a, 15b, 15c, 15d. It will be appreciated that in other embodiments falling within the scope of the invention the packing and/or gripping member 10 may comprise fewer than or greater than four inflatable elements 15a, 15b, 15c, 15d.

The plurality of inflatable elements 15a, 15b, 15c, 15d may be arranged in a stack, although for illustrative purposes they are shown in a exploded view in FIG. 1.

Each inflatable element 15a, 15b, 15c, 15d comprises an inlet 20a, 20b, 20c, 20d.

Each inlet 20a, 20b, 20c, 20d is disposed at a perimeter of a face or plate of an inflatable element 15a, 15b, 15c, 15d. Each inlet 20a, 20b, 20c, 20d may be adapted for coupling to a line, such as a hydraulic line (not shown). The inlet may be adapted for supplying fluid, such as a pressurised fluid, to the packing and/or gripping member 10.

The inflatable elements 15a, 15b, 15c, 15d of the of the packing and/or gripping member 10 are shown in a deflated configuration.

A periphery 25a, 25b, 25c, 25d of each inflatable element 15a, 15b, 15c, 15d comprises four corners, each corner comprising a concave portion 30a, 30b, 30c, 30d. That is, the periphery 25a, 25b, 25c, 25d of each inflatable element 15a, 15b, 15c, 15d correspond to a substantially rectangular shape with concave cut-away portions 30a, 30b, 30c, 30d at each corner.

Each concave portion 30a, 30b, 30c, 30d is joined to an adjacent side of the periphery by at least one convex portion 35a, 35b, 35c, 35d, 40a, 40b, 40c, 40d. A length or extent of each concave portion 30a, 30b, 30c, 30d is greater than a length or extent of the convex portion 35a, 35b, 35c, 35d, 40a, 40b, 40c, 40d.

The periphery 25a, 25b, 25c, 25d of each inflatable element 15a, 15b, 15c, 15d comprise a pair of symmetrical sides 45a, 45a', 45b, 45b', 45c, 45c' 45d, 45d'. Each side of the periphery 25a, 25b, 25c, 25d comprises a substantially straight portion.

Each straight portion may be adjoined to an adjacent straight portion by at least one concave portion 30a, 30b, 30c, 30d and at least two convex portions 35a, 35b, 35c, 35d, 40a, 40b, 40c, 40d.

Figure 2A:
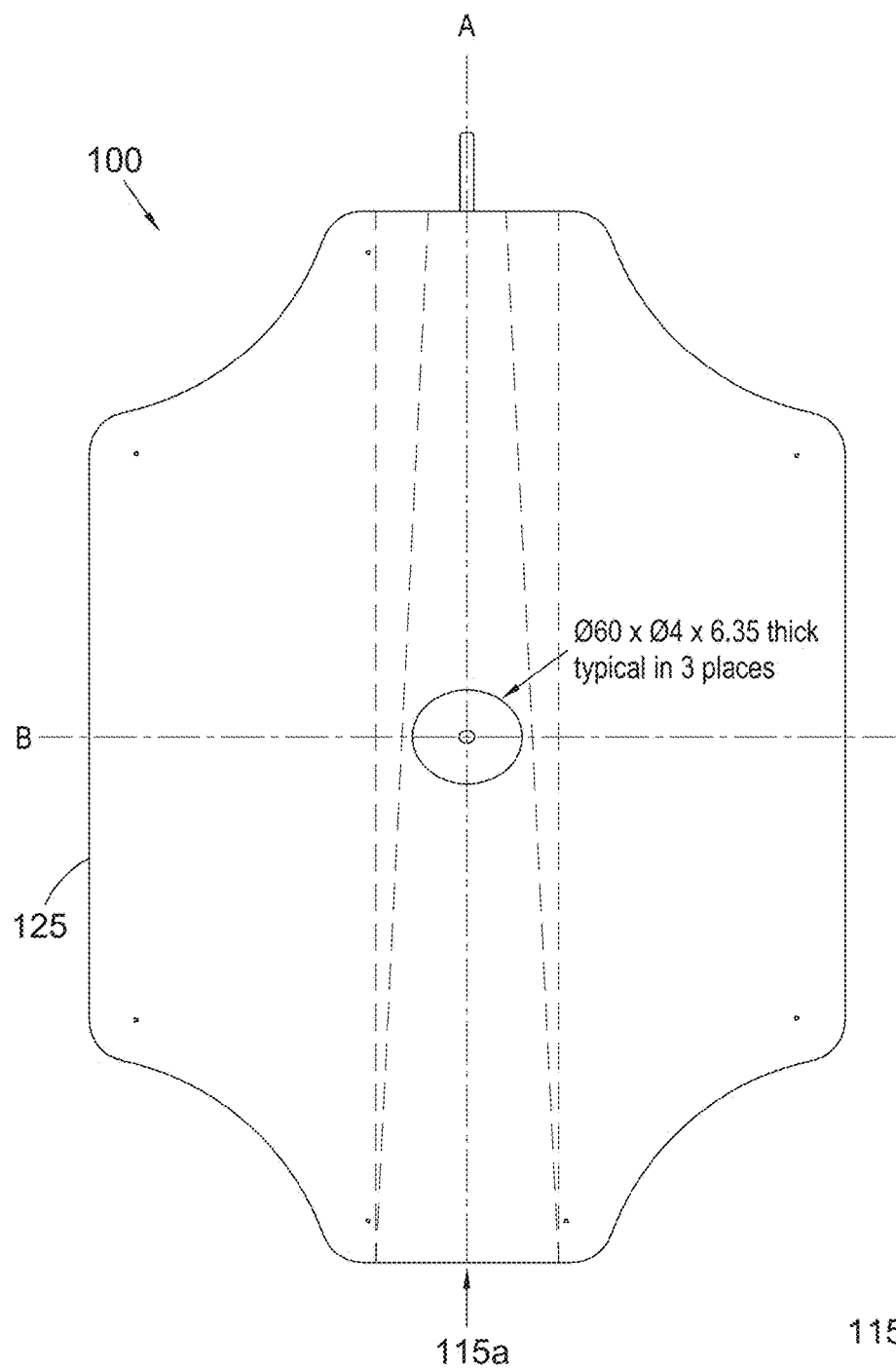
FIG. 2a a front view of the packing and/or gripping member according to further embodiment of the present invention.

Referring now to FIG. 2a, there is shown a front view of an inflatable element 115a of a packing and/or gripping member according to a further embodiment of the present invention. the packing and/or gripping member is generally denoted 100.

The periphery 125 of the inflatable element 115a is substantially symmetrical about a first axis A. The periphery of the inflatable element is substantially symmetrical about a second axis B. The second axis B is perpendicular to the first axis A.

Figure 2B:
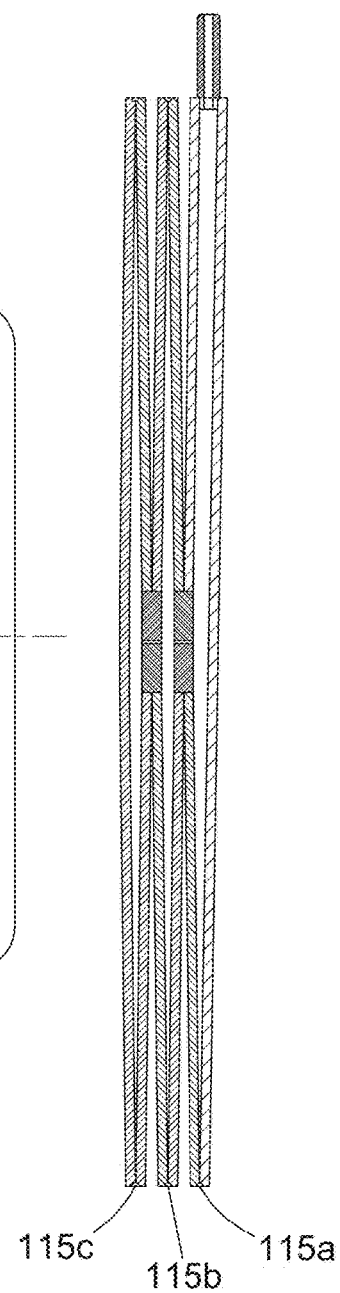

Referring now to FIG. 2b, there is shown a side cross-sectional view of the packing and/or gripping member 100. The packing and/or gripping member 100 is shown in a retracted configuration. That is, the inflatable elements 115a, 115b, 115c are deflated.

Figure 3:
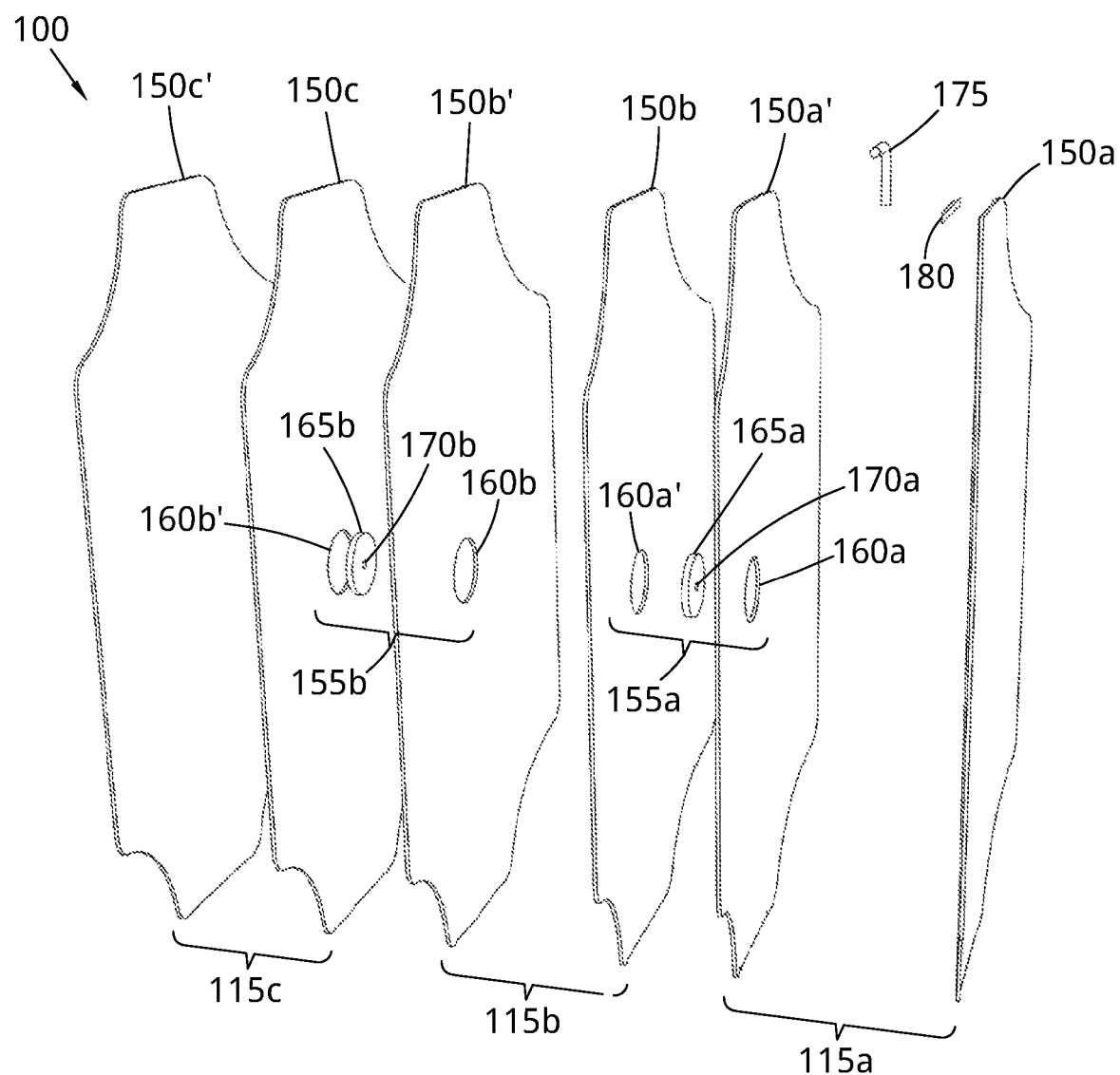

FIG. 3 shows a perspective, exploded view of the packing and/or gripping member 100 of FIG. 2b. The packing and/or gripping member is comprised of three inflatable elements 115a, 115b, 115c. Each inflatable element 115a, 115b, 115c comprises two plates 150a, 150a'; 150b, 150b'; 150c, 150c'. Each pair of plates 150a, 150a'; 150b, 150b'; 150c, 150c' is adjacent to one another. Each plate 150a, 150a'; 150b, 150b'; 150c, 150c'comprises a sheet material. Each plate 150a, 150a'; 150b, 150b'; 150c, 150c' is substantially planar.

FIG. 3 shows two ports 155a, 155b. In the example embodiment of FIG. 3, the first inflatable element 115a can be communicably coupled to the second inflatable element 115b by the first port 155a. The second inflatable element 115b can be communicably coupled to the third inflatable element 115c by the second port 155b.

A hole 160a, 160a', 160b, 160b' corresponding to a portion of each port 155a, 155b is disposed within a plate 150a'; 150b, 150b'; 150c of each of the plurality of inflatable elements 115a, 115b, 115c.

Each port 155a, 155b is disposed at a centre of, or substantially at a centre of, the plates 150a'; 150b, 150b'; 150c of the plurality of inflatable elements 115a, 115b, 115c. The outer plates 150a, 150c' do not comprise holes.

The ports 155a, 155b each comprise a coupling member 165a, 165b. The coupling members 165a, 165b are substantially ring shaped. The coupling members 165a, 165b comprise a throughbore 170a, 170b.

Referring again to FIG. 2b, an assembled packing and/or gripping member 100 is shown. It can be seen that the first inflatable element 115a, the second inflatable element 115b and the third inflatable element 115c are adjacent to one another. As such, the holes 160a, 160a', 160b, 160b' are substantially aligned. The ports 155a, 155b further comprise the coupling members 165a, 165b affixedly attached within the holes 160a, 160a', 160b, 160b', thus communicably coupling the inflatable elements 115a, 115b, 115c.

Also shown in FIG. 3 is an inlet 175. The inlet 175 is disposed at a perimeter of the inflatable element 115a.

The inflatable element 115a comprising the inlet 175 is disposed at an outer position within the packing and/or gripping member 100. One will appreciate that in alternative embodiments of the invention, the inlet 175 may be disposed on one of the inner inflatable elements 15b, 15c, 115b. In use, the inlet 175 may be adapted for coupling to a line, such as a hydraulic line (not shown). As such, the inlet 175 may be adapted for supplying fluid, such as a pressurised fluid, to the packing and/or gripping member 100.

The inflatable element 115a comprising the inlet 175 also comprise a spacer member 180.

When the inflatable element 115a is assembled, the spacer member 180 is disposed at, or around, the inlet 175. The spacer member 180 is disposed between adjacent plates 150a, 150a' of an inflatable element 115a. The spacer member 180 is configured to separate adjacent plates 150a, 150a' of the inflatable element 115a when the inflatable element 115a is deflated, i.e. the packing and/or gripping member is in a retracted configuration. The spacer member 180 is generally wedge-shaped.

Figure 4:
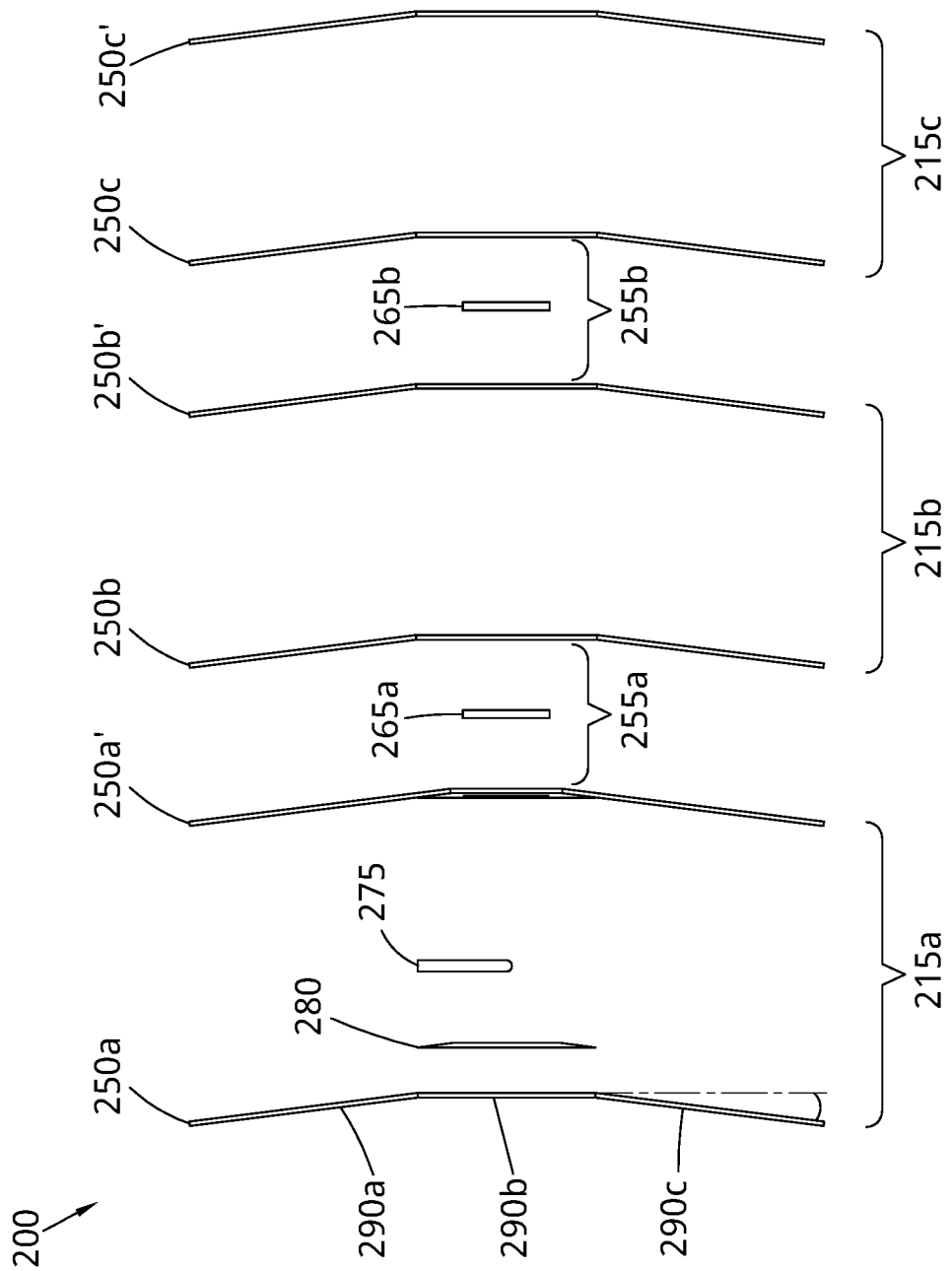
FIG. 4 a top, exploded view of a packing and/or gripping member according to a yet further embodiment of the present invention.

Referring now to FIG. 4, there is shown a top, exploded view of a packing and/or gripping member, generally denoted 200, according to the first embodiment of the present invention.

The packing and/or gripping member 20 is comprised of three inflatable elements 215a, 215b, 215c. Each inflatable element 215a, 215b, 215c comprises two plates 250a, 250a'; 250b, 250b'; 250c, 250c'. Each pair of plates 250a, 250a'; 250b, 250b'; 250c, 250c' is adjacent to one another. Each plate 250a, 250a'; 250b, 250b'; 250c, 250c' comprises a sheet material. Each plate 250a, 250a'; 250b, 250b'; 250c, 250c' is substantially planar.

FIG. 4 shows two ports 255a, 255b. In the example embodiment of FIG. 4, the first inflatable element 215a can be communicably coupled to the second inflatable element 215b by the first port 255a. The second inflatable element 215b can be communicably coupled to the third inflatable element 215c by the second port 2155b.

Each port 255a, 255b is disposed at a centre of, or substantially at a centre of, the plates 250a'; 250b, 250b'; 250c of the plurality of inflatable elements 215a, 215b, 215c. The ports 255a, 255b each comprise a coupling member 265a, 265b.

Also shown in FIG. 3 is an inlet 275. The inflatable element 215a comprising the inlet 275 is disposed at an outer position within the packing and/or gripping member 200. The inflatable element 215a comprising the inlet 275 also comprise a spacer member 280.

When the inflatable element 215a is assembled, the spacer member 280 is disposed at, or around, the inlet 275. The spacer member 280 is disposed between adjacent plates 250a, 250a' of an inflatable element 215a. The spacer member 280 is configured to separate adjacent plates 250a, 250a' of the inflatable element 215a when the inflatable element 215a is deflated, i.e. the packing and/or gripping member is in a retracted configuration. The spacer member 280 is generally wedge-shaped.

Each inflatable element 215a, 215b, 215c form a curved shape when deflated. Each inflatable element 215a, 215b, 215c of the plurality of inflatable elements comprises a plurality of substantially straight portions 290a, 290b, 290c. Each substantially straight portions 290a, 290b, 290c is inclined at an angle α relative to an adjacent substantially straight portion 290a, 290b, 290c. An angle of inclination between straight portions may typically be in the range of 6 degrees, but may be more or less, depending in particular on a radius of an annular void into which the packing and/or gripping member will be inserted in use.

FIG. 5a shows a cross-sectional front view of an inflatable element 215a, 215b, 215c of FIG. 4. The coupling member 265a comprises a throughbore 270a. FIG. 5b shows a cross-sectional side view of the packing and/or gripping member 200 of FIG. 4 in an assembled state. The coupling members 265a, 265b are disposed within a hole disposed on each plate 250a', 250b, 250b', 250c of the inflatable elements 215a, 215b, 215c. Edge weld 285 secures the plates 250a', 250b, 250b', 250c to the coupling members 265a, 265b.

Figure 6:
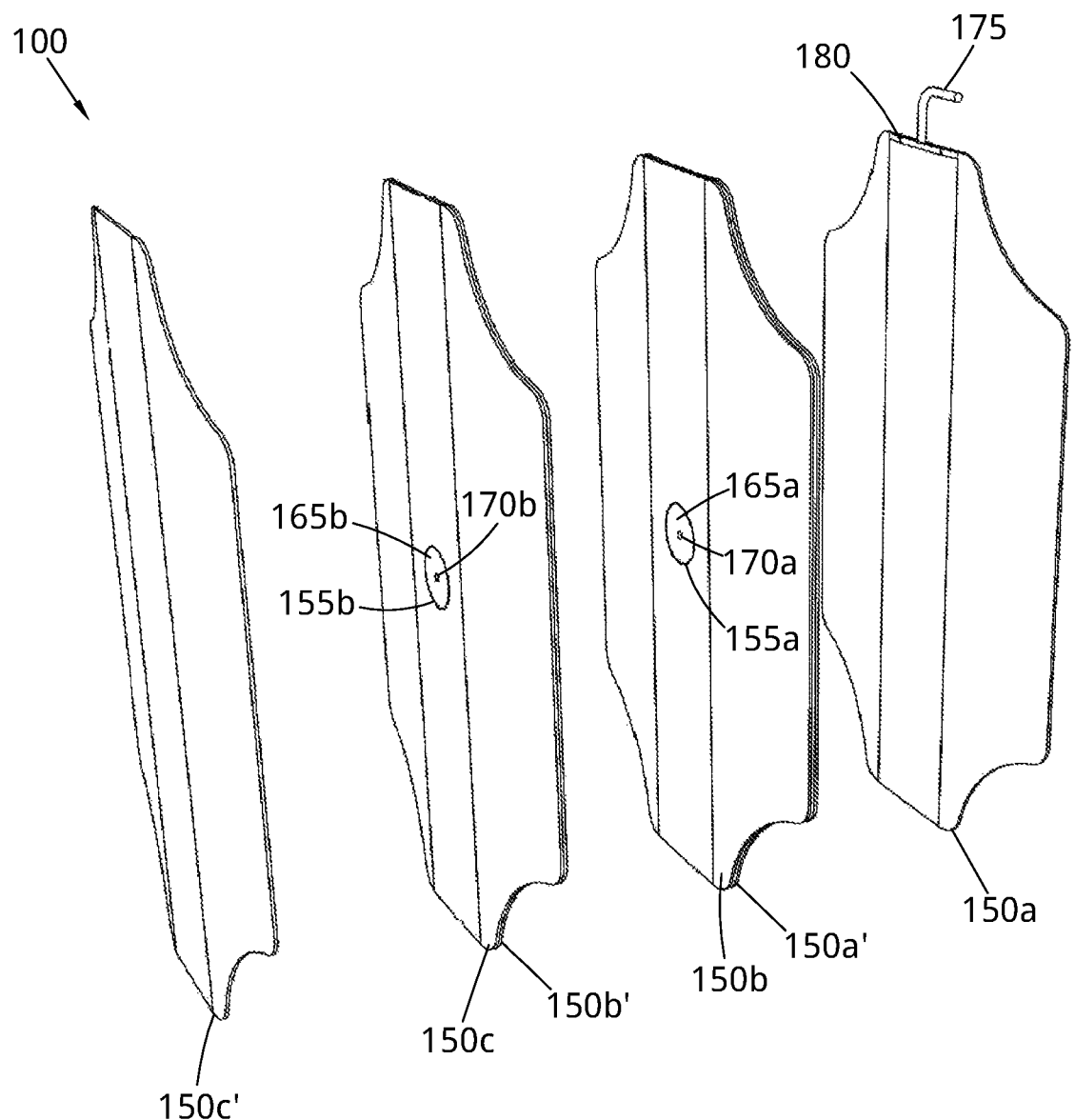

FIG. 6 shows a further exploded perspective view of the packers and/or gripper member 100 of FIG. 3. In comparison to FIG. 3, FIG. 6 shows the packers and/or gripper member 100 in a partially assembled state. Each of pair of plates 150a', 150b; 150b', 150c are communicably coupled by the ports 155a, 155b. Coupling members 165a, 165b comprise throughbores 170a, 170b.

Spacer member 180 is disposed along an edge, i.e. at the periphery, of plate 150a. The spacer member 180 is disposed at a base of the inlet 175. The spacer member 180 is configured to separate adjacent plates 150a, 150a' of the inflatable element 115a when the inflatable element 115a is deflated, i.e. the packing and/or gripping member is in a retracted configuration. The spacer member 180 is generally wedge-shaped.

When the partially assembled packers and/or gripper member 100 of FIG. 6 Is completely assembled, inflatable member 115a is formed by welding plates 150a, 150a' together. Inflatable member 115b is formed by welding plates 150b, 150b' together. Inflatable member 115c is formed by welding plates 150c, 150c' together.

Figure 7:
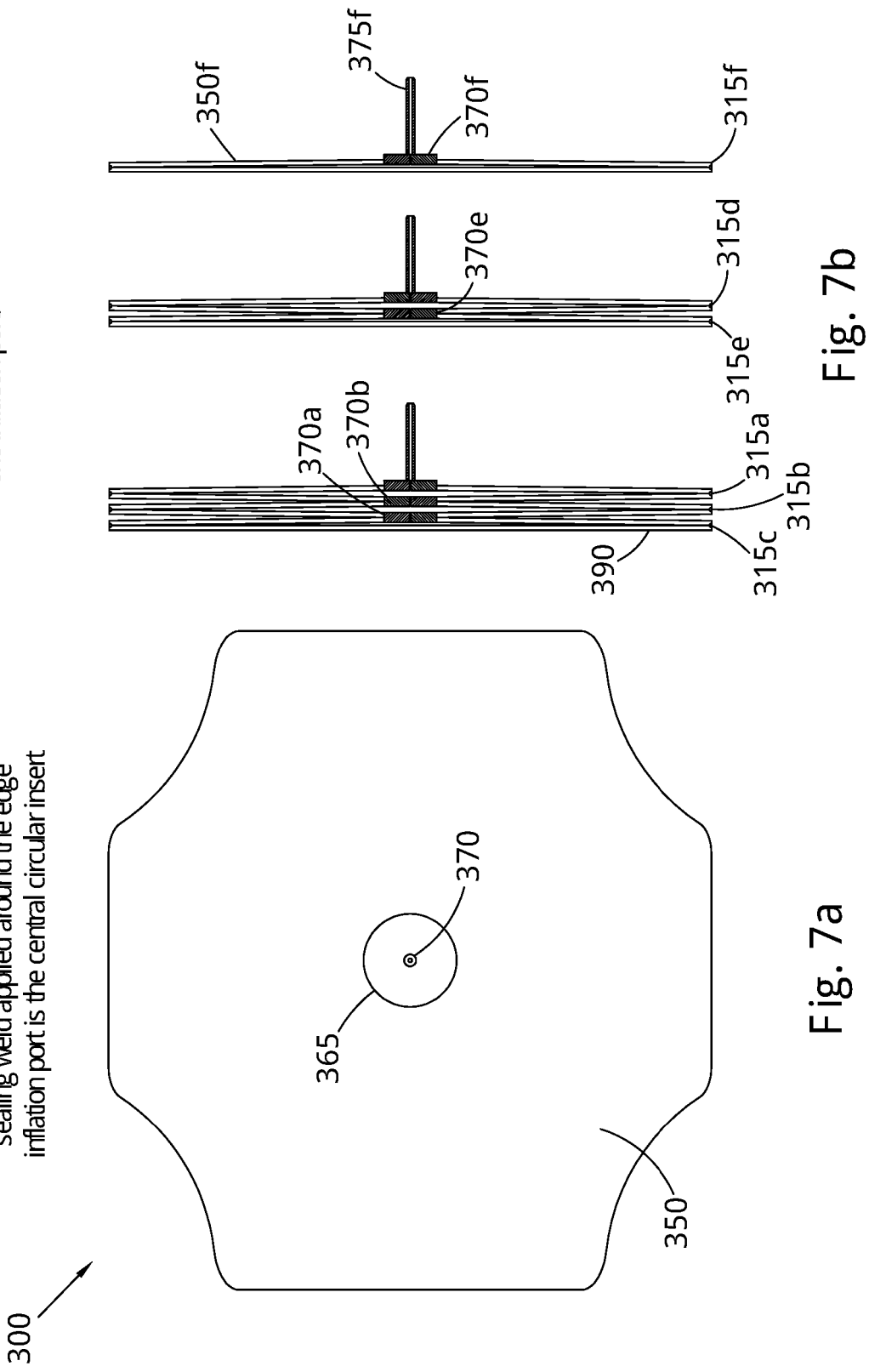

FIG. 7a shows a front cross-sectional view of a further embodiment of a packers and/or gripper member, generally denoted 300. FIG. 7a shows a plate 350 with a coupling member 365 inserted in a hole in the plate 350, thus forming a port. The coupling member 365, and hence the port, comprises a throughbore 370. FIG. 7b exemplifies how multiple configurations of the packing and/or gripping member 300 may be implemented. For example, an embodiment is shown comprising a single inflatable element 315f. This inflatable element comprises an outer port 370f on a plate 350f of the inflatable element 315f. The outer port 370f comprises an inlet 375f. The inlet 375f may be used to provide pressurised fluid to the inflatable element 315f. It will be appreciated that, in alternative embodiments of the invention, the inlet 375f may instead be disposed at a periphery of the inflatable element 315f, as shown in the embodiments of FIGS. 1, 2a, 2b, 3 and 6.

Figure 8:
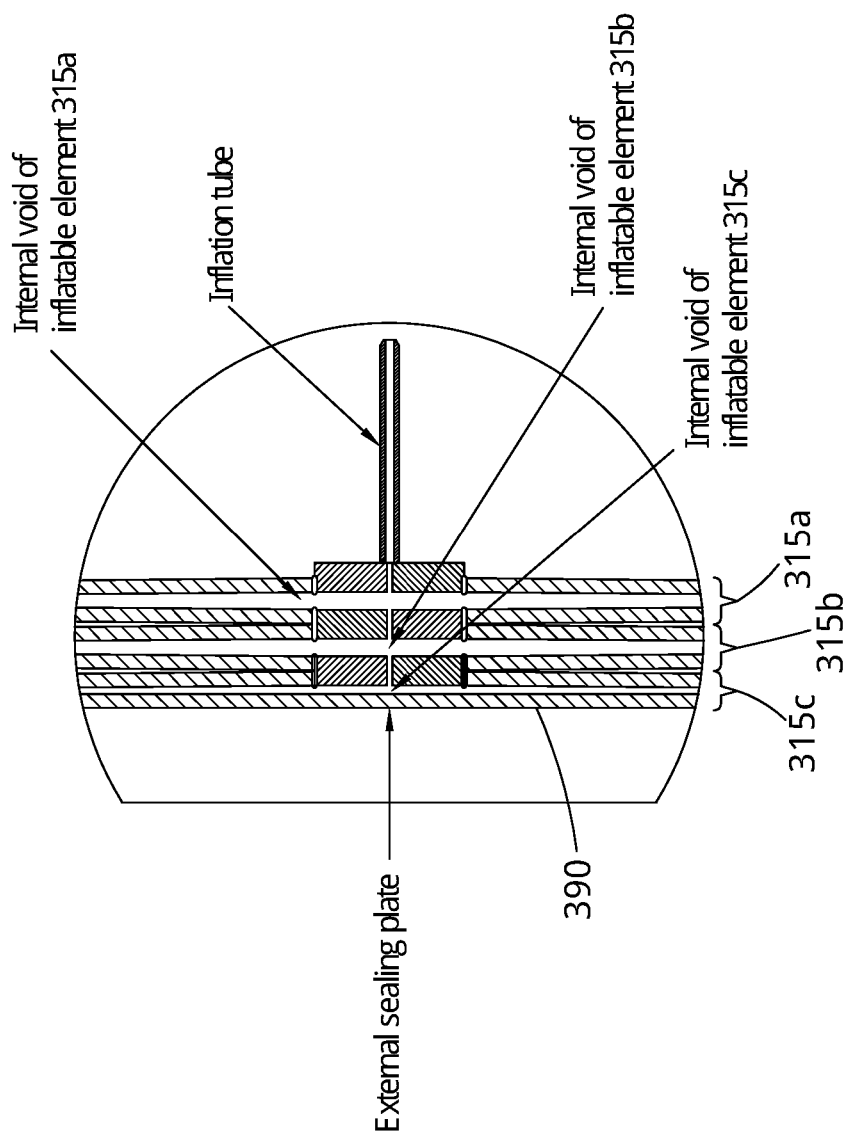
FIG. 8 a magnified view of a portion of the package and/or gripping member FIG. 7b.
Figure 9A:
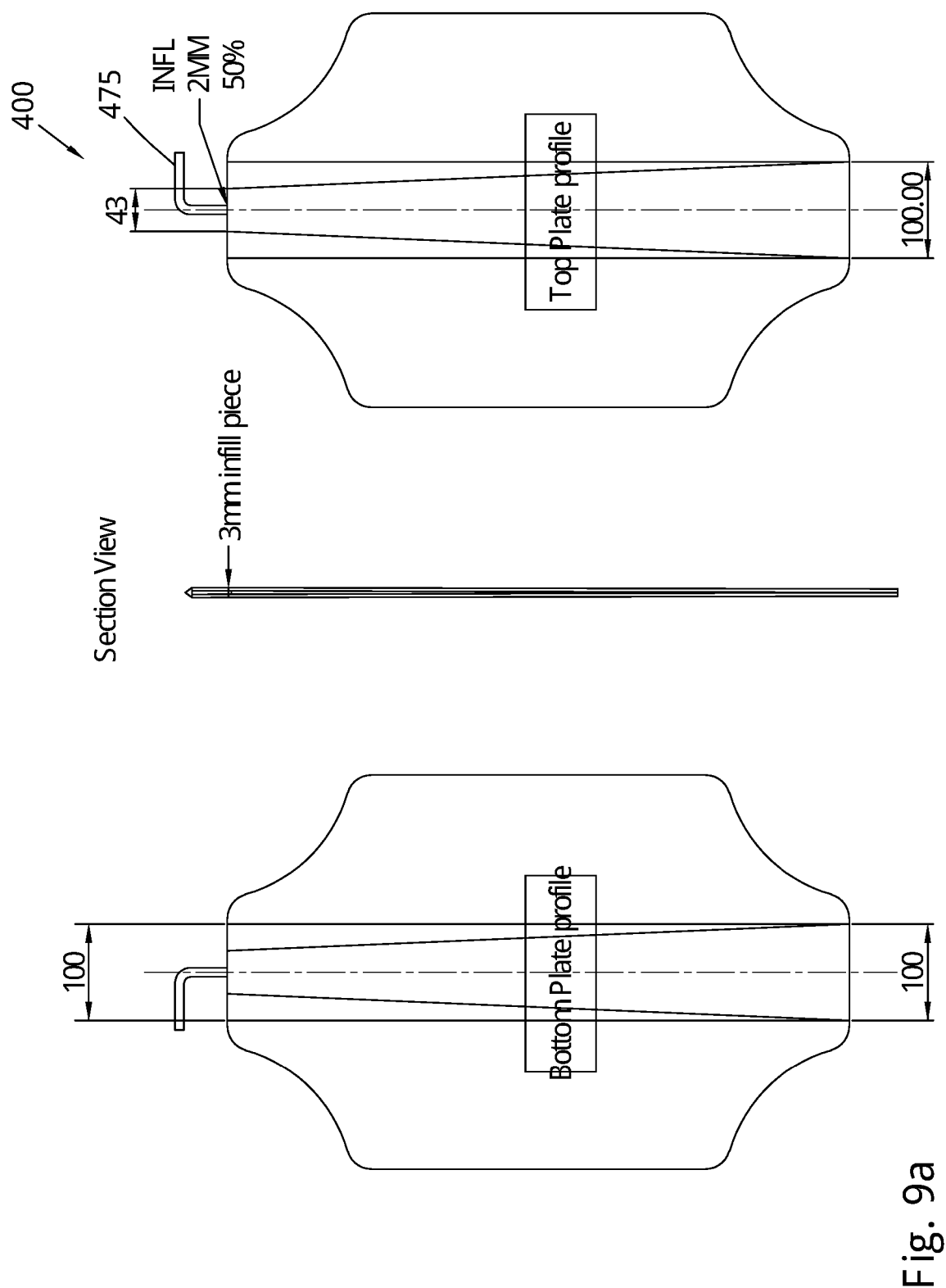

FIG. 7b also exemplifies a further configuration of a packing and/or gripping member 300, wherein two inflatable elements 315d 315e are communicably coupled by a port 370e. Similarly, FIG. 7b also exemplifies a further configuration of a packing and/or gripping member 300 wherein three inflatable elements 315a, 315b, 315c are communicably coupled by ports 370a, 370b. An outer plate 390 e.g. an external sealing plate, of inflatable element 315c does not comprise a hole for mounting a coupling member. FIG. 8 provides a magnified view of FIG. 7b. The packing and/or gripping member 300 is shown in a retracted or deflated state.

FIGS. 9a to 9e provide technical drawings of an embodiment of an inflatable element, generally denoted 400. Any dimensions shown are for example purposes only. The inflatable element 400 comprises an inlet 475. For illustrative purposes, there is no port shown on the inflatable element 400. As such, the embodiment shown may provide a packing and/or gripping member with a single inflatable element 400. It will be appreciated that in other embodiments the inflatable element may comprise a port as exemplified in the embodiments of FIGS. 2a, 2b, 3, 4, 5a, 5b, 6, 7a, 7b and 8.

FIG. 9c shows a top view of the inflatable element 400. It can be seen that the inflatable element 400 forms a curved shape when deflated. The inflatable element 400 comprises a plurality of substantially straight portions 490a, 490b, 490c. Each substantially straight portion 490a, 490b, 490c is inclined at an angle α relative to an adjacent substantially straight portion 490a, 490b, 490c. An angle of inclination between straight portions may typically be in the range of 6 degrees, but may be more or less, depending in particular on a radius of an annular void into which the packing and/or gripping member will be inserted in use.

Spacer member 480 is disposed along an edge, i.e. at the periphery, of the inflatable element 400. The spacer member 480 is disposed at a base of the inlet 475. The spacer member 480 is configured to separate adjacent plates 450a, 450a' of the inflatable element 400 when the inflatable element 400 is deflated, i.e. the packing and/or gripping member is in a retracted configuration. The spacer member 480 is generally wedge-shaped.

In some embodiments falling within the scope of the present invention, the spacer member 480 can be formed as part of, or integral to, the inlet.

Additional information pertaining to FIGS. 9a to 9e is as follows:
1. ALL DIMENSIONS IN MILLIMETRES U.N.O
2. ALL FABRICATION TO BE IN ACCORDANCE WITH PD 5500-2006 UNFRED FUSION WELDED PRESSURE VESSELS
3. WELD INSPECTION TO BE 100% LIQUID DYE PENETRANT INSPECTION (ISO 2059) TO INCLUDE:
   PRECLEANING WITH SOLVENT
   APPLICATION OF PENETRANT WITH SUITABLE DWELL TIME
   EXCESS PENETRANT REMOVAL
   APPLICATION OF DEVELOPER
   INSPECTION WITH VISIBLE LIGHT WITH INTENSITY OF 1100 LUX OR GREATER
4. WELDING PROCEDURE SPECIFICATION (WPS) TO BS EN ISO 156 14-8:2002 (OR EQUIVALENT)
5. A WELDING PROCEDURE QUALIFICATION RECORD (WPQR) FOR WELDERS SHOULD BE IN ACCORDANCE WITH BS 4871-3, (OR EQUIVALENT) INCLUDING MECHANICAL AND NON DESTRUCTIVE TESTING RECORDS FOR THE TEST WELDS
6. ALL MATERIAL CERTS TO BE BS EN 10204-3.1, TO INCLUDE
   PACKER PLARE
   FILLER WIRE (IF USED)
   SHIELDING GAS (IF USED)
7. ALL MATERIALS TO ASTM 316/EN 1.4401:
   UPPER AND LOWER PLATE 3 MM THICK
   INFLATION TUBE 8 MM OD×2 MM WT
   INFILL PIEVE FROM 3 MM DISCARD PLATE
8. ZERO WELD GAP ALL OVER
9. MINIMUM THROUT THICKNESS 5 MM ALL OVER
10. LEAK TEST POST WELD WITH A VACUUM TEST. VACUUM TO LESS THAT 5 MILLIBAR ABSOLUTE AND HOLD FOR 15 MINS ONE TEST PER 15 ELEMENTS.

Figure 10:
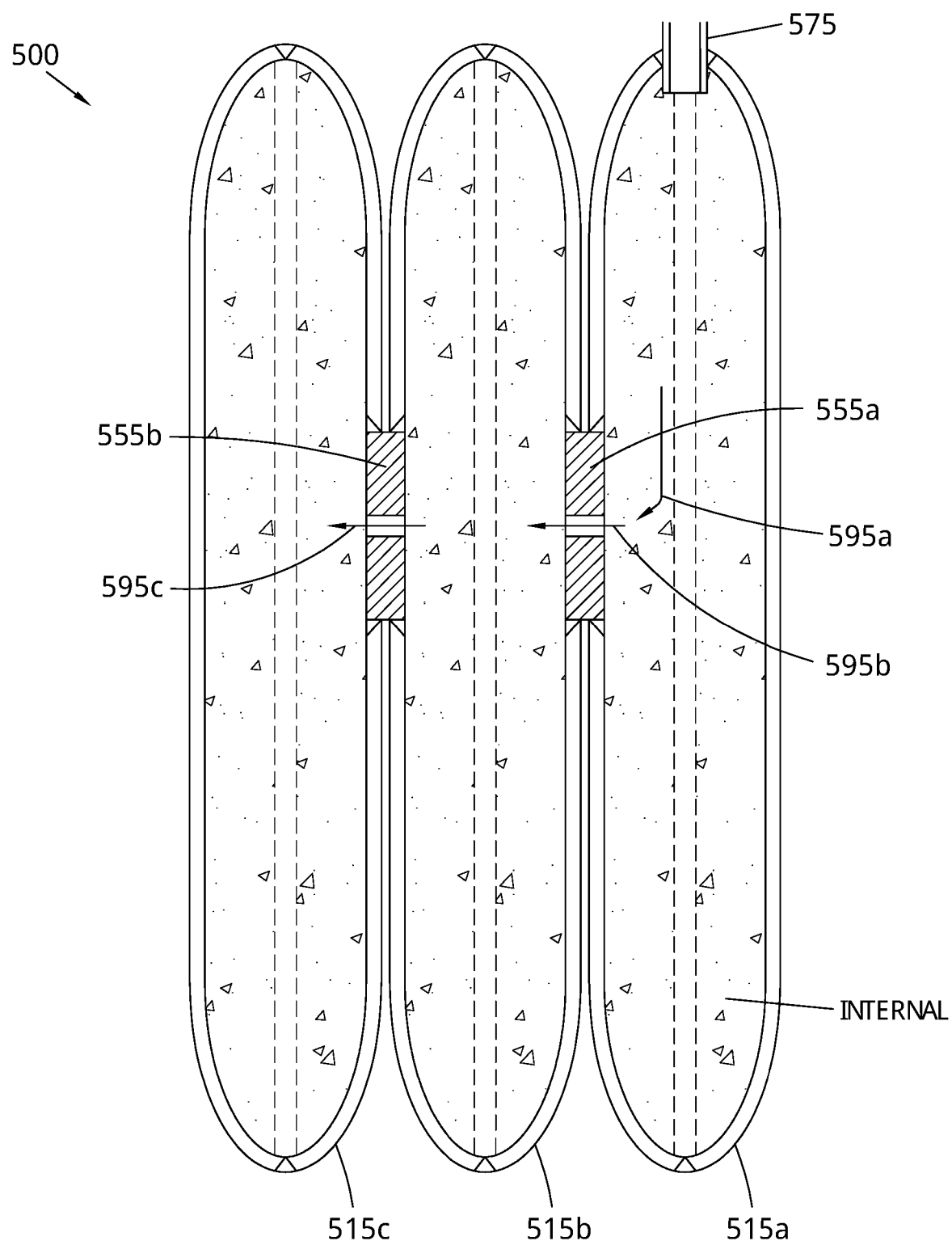
FIG. 10 a representation showing a cross-section of a packing and/or gripping member in an expanded configuration according to an embodiment of the present invention.
Figure 11A:
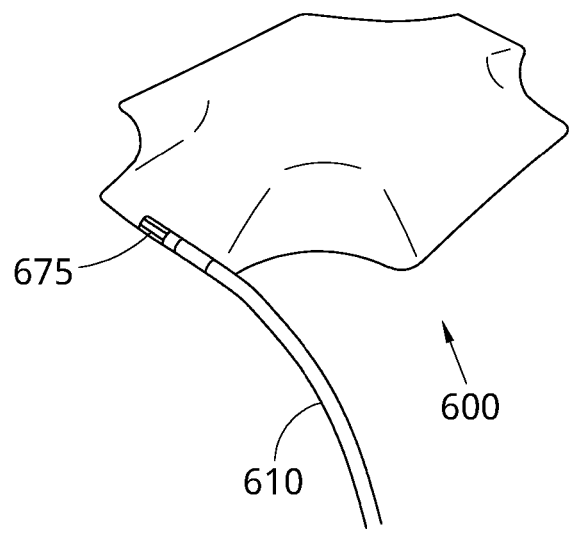
FIGS. 11a to d a series of photographs of an inflatable element of a packing and/or gripping member, according to an embodiment of the present invention, the inflatable element being in an inflated state.
Figure 11B:
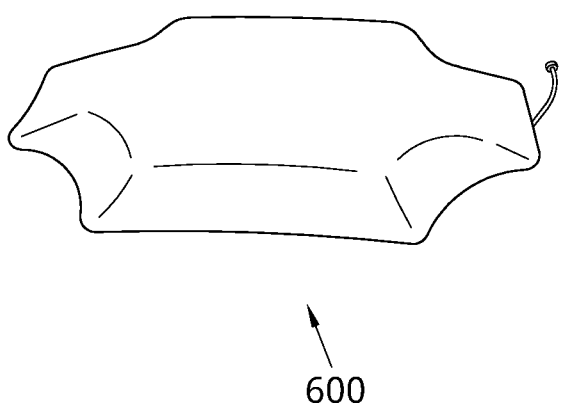
Figure 11C:
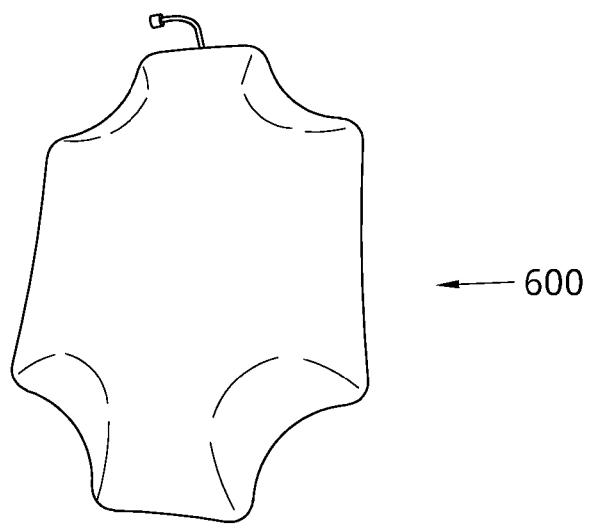
Figure 11D:
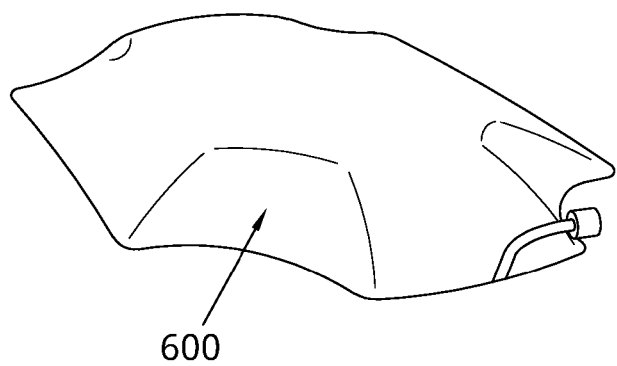

FIG. 10 is a sketch of a cross-section of a packing and/or gripping member, generally denoted 500, in an expanded configuration, according to an embodiment of the present invention. Fluid is input via the inlet 575. Arrows 595a, 595b, 595c show the direction of a flow of fluid input via inlet 575. The fluid passes through each port 555a, 555b and inflates each inflatable element 515a, 515b, 515c.

FIGS. 11a to 11d are photographs showing an inflatable element 600 in an inflated state. The inlet 675 is disposed at a perimeter of the plates of the inflatable element 600. The inlet is coupled to a line 610. The line 610 supplies fluid to the inflatable element 600.

Figure 12:
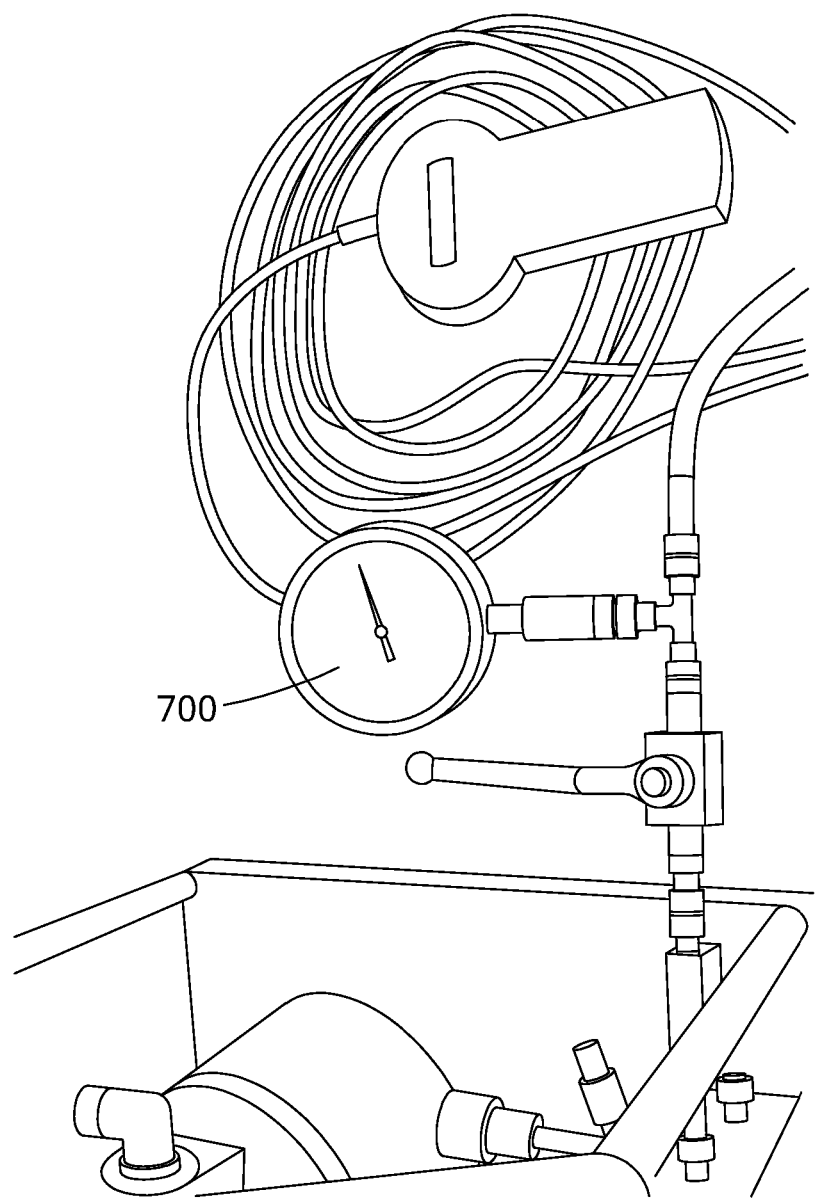
FIG. 12 a photograph of a portion of a test rig for use with a packing and/or gripping member according to an embodiment of the present invention.
Figure 13:
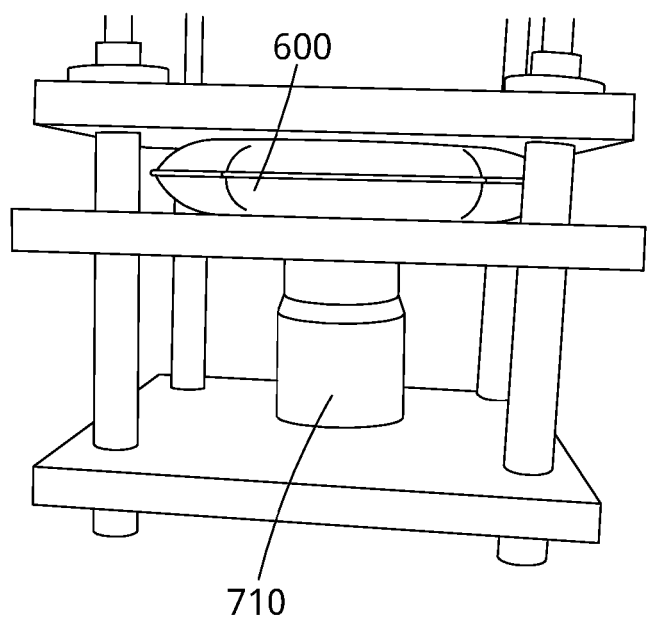
FIG. 13 a photograph of an inflatable element on a test rig, wherein the inflatable element is intended for use in packing and/or gripping member according to an embodiment of the present invention.

FIG. 12 is photograph of a portion of a test rig for use with an embodiment of the present invention. A valve 700 shows a pressure applied to inflate the inflatable element 600, or to maintain the inflatable element 600 in an inflated state. In the exemplary embodiment shown, the pressure is approximately 120 Bar (1740 psi). FIG. 13 shows a device 710 configured to apply a pressure, via a test rig, to the inflatable element 600 for the purposes of testing the inflatable element 600. The device 710 is applying a force of approximately 107 tonnes. It will be appreciated that this is an example, and the inflatable element 600 may be capable of withstanding greater applied forces.

Figure 14A:
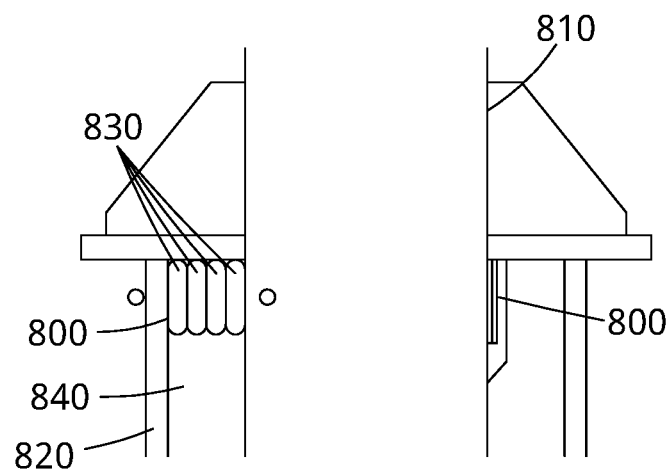
FIG. 14a to b schematic representations of a packing and/or gripping arrangement according to an embodiment of the present invention in an annular space between a portion of a support structure fixed to a portion of a foundation in the expanded configuration (left) and in the retracted configuration (right)
Figure 14B:
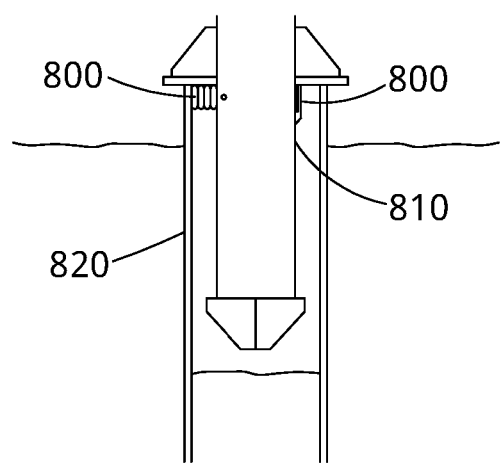

FIGS. 14a and 14b depict a packing and/or gripping member 800 positioned in an annular space between a leg 810 of a jacket and a seafastening socket 820. The left side of FIGS. 14a and 14b depict the packing and/or gripping member 800 in an expanded configuration, in which all of the inflatable elements 830 of the packing and/or gripping member are expanded, e.g. inflated. In the expanded configuration of the packing and/or gripping member 800, the packing and/or gripping member 800 extends in the annular space 840 and exerts a force and/or load onto the leg 810 of the jacket and the seafastening socket 820. The force and/or load exerted by the packing and/or gripping member 800 can be considered as acting in a radial direction, such as for example a radial inward and/or radial outward direction. The force and/or load exerted by the packing and/or gripping member 800 may cause the leg 810 to be secured to the seafastening socket 820 and minimise or prevent any movement of the leg 810 relative to the seafastening socket 820. Once the leg 810 or all legs of the jacket have been secured to the respective seafastening sockets, a curable, settable or fixable material, e.g. cement, (not depicted in FIGS. 14a and 14b) may be injected into the annular space 840 to permanently fix the jacket to the seafastening socket 820.

The packing and/or gripping member 800 may be left in place after curing of the cement. The packing and/or gripping member 800 may be considered to be sacrificial.

The right side of FIGS. 14a and 14b depicts the packing and/or gripping member 800 in the retracted configuration. In the embodiment depicted in FIGS. 14a and 14b, the packing and/or gripping member 800, e.g. the inflatable members 830, is arranged on the leg 810 of the jacket. It will be appreciated that in other embodiments the packing and/or gripping member may be provided with the seafastening socket.

Figure 15:
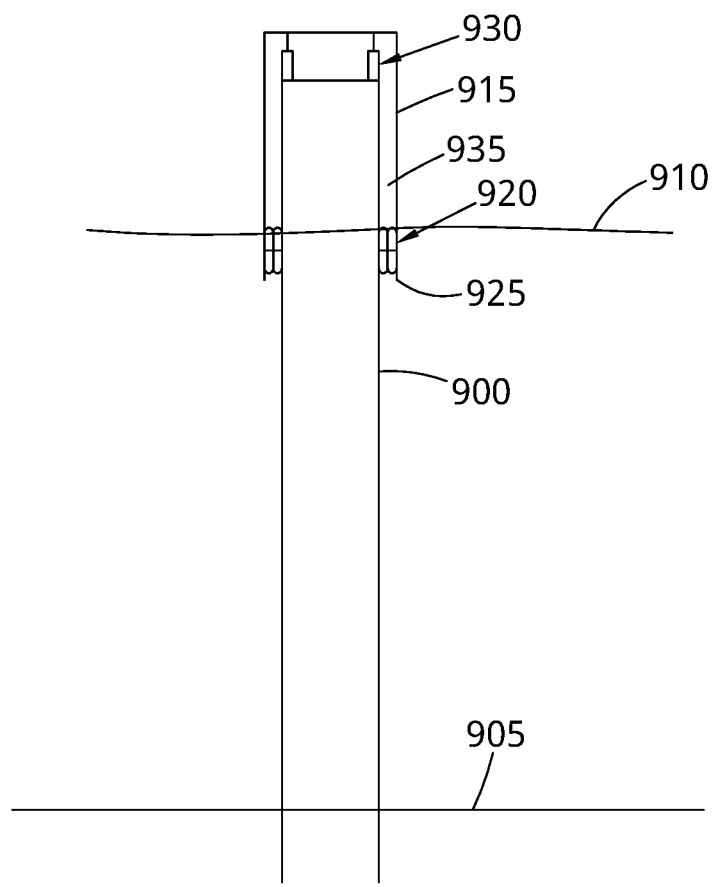
FIG. 15 a schematic representation of another system for securing a support structure to a foundation.

FIG. 15 depicts another embodiment of a system for securing a support structure to a foundation. In the embodiment depicted in FIG. 15, the foundation is provided in the form of a monopile 900 that has been driven into the seabed 905, for example by a pile hammer or the like. The monopile 900 may extend above a sea level 910.

In the example embodiment, the support structure for supporting a wind turbine structure is provided in the form of a transition piece 915. The transition piece 915 can be arranged on a free end of monopile 900, such as for example on an end portion of the monopile 900 that extends above the sea level 910, to surround a portion of the monopile 900. The transition piece 915 may comprise a tubular shape. The transition piece 915 may be configured to receive the free end of the monopile 900.

The system depicted in FIG. 15 comprises a packing and/or gripping member 920. The packing and/or gripping member 920 comprises any of the features of the member 920 described above in relation to FIGS. 1 to 14.

In the embodiment depicted in FIG. 15, the packing and/or gripping member 920 may be arranged in an annular space formed between the monopile 900 and the transition piece 915. The packing and/or gripping member 920 may be arranged in proximity of an opening 925 of the transition piece 915. The packing and/or gripping member 920 may be arranged on and/or around an outer periphery or circumference of the monopile 900, e.g. to fully or partially extend around the outer periphery or circumference of the monopile 900. Alternatively, the packing and/or gripping member 920 may be arranged on and/or around an inner periphery or circumference of the transition piece 915, e.g. to fully or partially extend around the inner periphery or circumference of the transition piece 915.

The transition piece 915 may comprise one or more levelling actuators. The levelling actuators may be configured to allow for orienting and/or levelling of the transition piece 915 relative to the monopile 900. The one or more levelling actuators may be provided in the form of one or more cylinder and/or piston arrangement 930, such as for example a hydraulic or pneumatic cylinder and/or piston arrangement or the like.

The packing and/or gripping member 920 is configured to secure the transition piece 915 to the monopile 900, when the packing and/or gripping member 920 is in the expanded configuration. This may prevent movement of the transition piece 915 relative to the monopile 900, for example due to waves that may be present at the sea level 910, thereby allowing levelling of the transition piece 915 relative to the monopile 900. Once the transition piece 915 is levelled relative to the monopile 900, the transition piece 915 may be permanently fixed to the monopole 900, for example, by injecting the settable, curable or fixable material into the annular space 935 between the transition piece 915 and the monopile 900 and allowing the settable, curable, or fixable material to become cured.

The exemplary packing and/or gripping member 920 described herein allows a supporting structure, such as for example a jacket or transition piece, (or a portion thereof) to be secured to a foundation, such as for example seafastening sockets or a monopile, independent of weather condition. Once the supporting structure is secure to the foundation, the supporting structure may be permanently fixed to the foundation, e.g. without having to wait for improved weather conditions. This may allow for reduced costs for installing the supporting structure to the foundation.

The packing and/or gripping member may secure the supporting structure to the foundation and/or minimise or prevent movement of the supporting structure relative to the foundation, while the settable, curable or fixable material is cured. The settable, curable or fixable material can continue to cure, regardless of the weather conditions. This may provide a strong and robust connection between the supporting structure and the foundation.

Figure 16A:
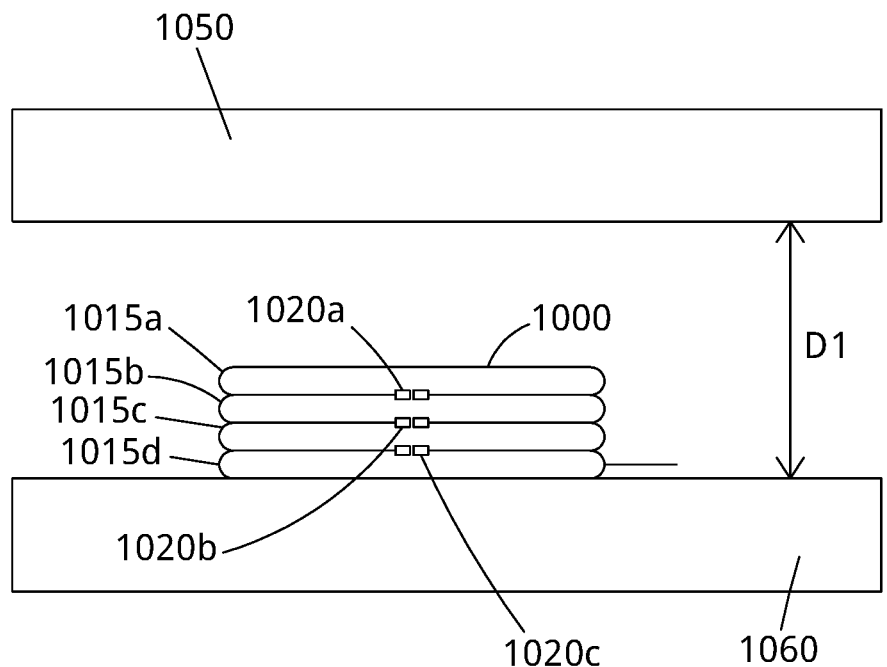
FIGS. 16a and b schematic representation of a packer and/or gripper member according to an embodiment of the present invention in a deflated and inflated state, respectively, shown jacking of a structure.
Figure 16B:
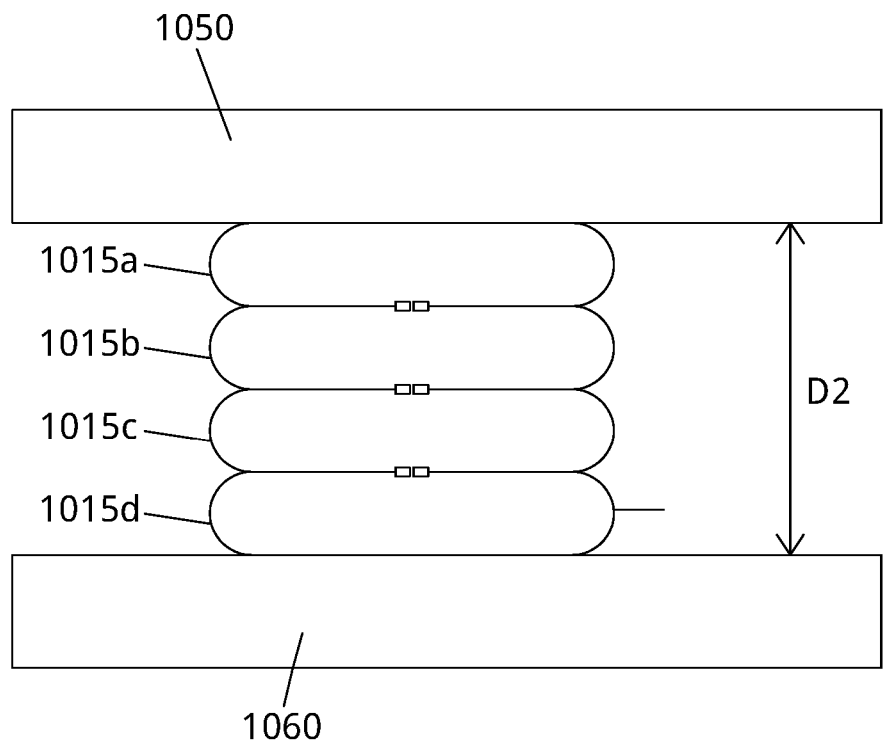

Referring now to FIGS. 16a and 16b, there is shown a packer member 1000 according to an embodiment of the present invention in deflated and inflated states respectfully. The packer member 1000 is utilised to jack-up a first structure 1050, e.g. lift the first structure 1050 relative to a second structure 1060.

For purposes of example only, the packer member 1000 is a packer member according to the embodiment shown in FIG. 2, e.g. a packer member 1000 comprising a plurality of inflatable elements or cushions 1015a, 1015b, 1015c, 1015d, wherein each inflatable element or cushion is communicably coupled to an adjacent inflatable element by a port 1020a, 1020b, 1015c disposed between the inflatable elements or cushions 1015a, 1015b, 1015c, 1015d. The plurality of inflatable elements or cushions 1015a, 1015b, 1015c, 1015d is arranged in a stack, to form the packer member 1000.

It will be appreciated that in other example embodiments of the invention, each inflatable element or cushion 1015a, 1015b, 1015c, 1015d may be directly inflated/deflated via a port or valve (not shown), such that each inflatable element or cushion 1015a, 1015b, 1015c, 1015d is not directly coupled to an adjacent inflatable element by a port disposed between the inflatable elements 1015a, 1015b, 1015c, 1015d. For example, in other example embodiments of the invention the packer member 1000 may be a packer member according to the embodiment shown in FIG. 1, wherein each inflatable element or cushion 1015a, 1015b, 1015c, 1015d comprises an inlet disposed at a perimeter of a face or plate of each inflatable element 1015a, 1015b, 1015c, 1015d. In such an embodiment, each inlet 20a, 20b, 20c, 20d may be adapted for coupling to a line, such as a hydraulic line (not shown). The inlet may be adapted for supplying fluid, such as a pressurised fluid, to the packer member 1000.

In FIG. 16a, the packer member 1000 is positioned in a space or gap between the first structure 1050 and a second structure 1060, e.g. between surfaces of the first and second structures 1050, 1060.

The first structure 1050 may be any element or arrangement. For example, the packer member 1000 may be employed in the construction industry, e.g., in an on-shore construction industry, wherein the first structure 1050 represents any component of a building or structure, such as a strut or beam or the like. The packer member 1000 may be used for underpinning a structure.

It will be understood that the second structure 1060 is shown for purposes of example only, to represent a feature or item relative to which the first structure 1050 is jacked-up/lifted. That is, in other examples, the second structure 1060 may alternatively be any of a foundation, a support, a floor, a base or the like. The second structure 1060 represents any surface relative to which the first structure 1050 is jacked-up.

In FIG. 16a, the packer member 1000 is shown in a deflated configuration. In the deflated configuration, the packer member 1000 can be located and/or fitted/installed within the space or gap. For purposes of example, the space or gap is of a size or dimension represented by D1.

In FIG. 16b, the packer member 1000 is shown in an expanded configuration, e.g. an inflated/pressurised configuration, in which all of the inflatable elements 1015a, 1015b, 1015c, 1015d of the packing and/or gripping member are expanded.

In the expanded configuration the packer member 1000 extends in the space or gap and exerts a force and/or load onto the first structure 1050 and second structure 1060. In the example shown, the force and/or load exerted by the packer member 1000 can be considered as acting in a substantially vertical direction, thus providing a jacking/lifting force to the first structure 1050 relative to the second structure 1060.

The force exerted by the packer member 1000 may cause the first structure 1050 to be jacked-up/lifted relative to the second structure 1060. As such, in FIG. 16b the space or gap is of a size or dimension represented by D2, wherein D2 is larger than D1.

In other examples, the packer 1000 may be expanded to provide a stabilizing force, while not necessarily substantially jacking-up or lifting the first structure 1050 relative to the second structure 1060.

In use, once the first structure 1050 has been jacked-up/lifted/stabilized relative to the second structure 1060, a further structure or support may be disposed between the first structure 1050 and the second structure 1060. In other examples, a curable, settable or fixable material, e.g. cement (not depicted in FIGS. 16a and 16b) may be disposed in the space or gap to permanently fix the first structure 1050 relative to the second structure 1060. The packer member 1000 may be left in situ after curing of the cement. As such, the packer member 1000 may be considered to be sacrificial.

It will be appreciated that the embodiments of the present invention hereinbefore described are given by way of example only and are not meant to limit the scope of thereof in any way. It will be appreciated that embodiments of the present invention provide benefits over the prior art.

It will also be appreciated that embodiments of the present invention may provide a beneficial or advantageously (low) input force (pressure) to inflatable element expansion ratio or "stroke". It will further be appreciated that while the disclosed embodiments show rectilinear inflatable members, other shapes (closed shapes) of inflatable members may be envisaged, e.g. having three or more corners, wherein at least one of the corners comprises a concave portion.

The invention claimed is:

1. A packer and/or gripper member, such as an offshore and/or underwater packer and/or gripper member, comprising at least one inflatable element or cushion, wherein a periphery of the at least one inflatable element or cushion comprises at least one corner, the at least one corner comprising a concave portion, each side of the periphery comprises a substantially straight portion, and each straight portion is adjoined to an adjacent straight portion by, in sequence, a convex portion, the concave portion, and a further convex portion.

2. A packer and/or gripper member according to claim 1, wherein the at least one inflatable element comprises a plurality of corners and each corner comprises a concave portion.

3. A packer and/or gripper member according to claim 1, wherein the periphery of the at least one inflatable element corresponds to a substantially rectilinear shape with concave cut-away portions at each corner.

4. A packer and/or gripper member according to claim 1, wherein a length or extent of the at least one concave portion is greater than a length or extent of a/the curved, radiused and/or convex portion.

5. A packer and/or gripper member according to claim 1, wherein the periphery of the at least one inflatable element comprises at least one pair of symmetrical sides and/or each side of the periphery comprises a substantially straight portion.

6. A packer and/or gripper member according to claim 1, wherein the at least one inflatable element comprises two faces or plates, and wherein at least one of:
the two faces or plates are adjacent to one another;
each face or plate comprises a sheet material;
each face or plate is substantially planar;
each face or plate comprises, or is made or formed from, a deformable element;
each face or plate comprises or is made or formed from a metallic material.

7. A packer and/or gripper member according to claim 1, wherein: the at least one inflatable element is adapted to cooperate with one or more further inflatable elements to form a stack; and/or the at least one inflatable element comprises a port, the port being disposed at a centre of, or substantially at a centre of, a face or plate of the at least one inflatable element.

8. A packer and/or gripper member according to claim 1, wherein the port is adapted to communicably couple the at least one inflatable element to a further inflatable element.

9. A packer and/or gripper arrangement, such as an offshore packer and/or gripper arrangement, comprising a plurality of gripping members according to claim 1.

10. A packer and/or gripper arrangement according to claim 9 configured for arrangement in an annular space formed between at least one portion of a support structure and at least one portion of a foundation.

11. A structure, such as a support structure or a foundation for mounting a support structure, wherein the structure comprises a packer and/or gripper arrangement according to claim 9.

12. A system, such as an offshore system, for securing a support structure to a foundation, the system comprising: a foundation arranged on a floor of a body of water or a seabed; a support structure, the support structure being configured for attachment to the foundation; and a packer and/or gripper arrangement according to claim 9, wherein when the packer and/or gripper arrangement is in an expanded configuration, the packer and/or gripper arrangement is configured to secure at least one portion of the support structure to at least one portion of the foundation.

13. A method for securing a support structure to a foundation, the method comprising: arranging a foundation on a floor of a body of water or a seabed; arranging the support structure on the foundation; and securing at least one portion of the support structure to at least one portion of the foundation by actuating a packer and/or gripper arrangement according to claim 9 from a retracted configuration to an expanded configuration.

14. A method for actuating a packer and/or gripper arrangement, such as an offshore packer and/or gripper arrangement, from a retracted configuration to an expanded configuration, the method comprising the steps of: providing a packer and/or gripper arrangement according to claim 9; and supplying pressurised fluid to one of the inflatable elements.

15. The method according to claim 14, wherein the step of supplying pressurised fluid to one of the inflatable elements comprises supplying pressurised fluid to a plurality or stack of inflatable elements via an inlet disposed on only one of the inflatable elements.

\* \* \* \* \*